(12) United States Patent
Hu et al.

(10) Patent No.: US 11,865,920 B2
(45) Date of Patent: Jan. 9, 2024

(54) CONTROLLER FOR VEHICLE AIR CONDITIONER

(71) Applicant: HANGZHOU SANHUA RESEARCH INSTITUTE CO., LTD., Zhejiang (CN)

(72) Inventors: Jundi Hu, Zhejiang (CN); Junjie Yang, Zhejiang (CN); Liying Zhang, Zhejiang (CN)

(73) Assignee: HANGZHOU SANHUA RESEARCH INSTITUTE CO., LTD., Hangzhou (CN)

( * ) Notice: Subject to any disclaimer, the term of this patent is extended or adjusted under 35 U.S.C. 154(b) by 271 days.

(21) Appl. No.: 17/208,786

(22) Filed: Mar. 22, 2021

(65) Prior Publication Data

US 2021/0206273 A1 Jul. 8, 2021

Related U.S. Application Data

(63) Continuation of application No. PCT/CN2020/072515, filed on Jan. 16, 2020.

(30) Foreign Application Priority Data

Jan. 21, 2019 (CN) .......................... 201910053241.5

(51) Int. Cl.
*B60K 37/06* (2006.01)

(52) U.S. Cl.
CPC ........ *B60K 37/06* (2013.01); *B60K 2370/126* (2019.05); *B60K 2370/128* (2019.05); *B60K 2370/139* (2019.05); *B60K 2370/345* (2019.05)

(58) Field of Classification Search
CPC .............. B60K 37/06; B60K 2370/139; B60K 2370/345; B60H 1/0065; G05G 1/087; G05G 1/10; H01H 3/08; H01H 2003/085; F16C 33/3887
See application file for complete search history.

(56) References Cited

U.S. PATENT DOCUMENTS

| 1,825,365 | A | * | 9/1931 | Runge ................. F16C 33/3887 384/523 |
| 8,686,306 | B2 | | 4/2014 | Harris et al. .................. 200/336 |
| 9,557,761 | B2 | * | 1/2017 | Sönmez .................... G05G 1/10 |

(Continued)

FOREIGN PATENT DOCUMENTS

| CN | 101353005 A | 1/2009 |
| DE | 10 2015 115 044 A1 | 3/2017 |

(Continued)

OTHER PUBLICATIONS

Machine translation of EP 1795990 A1 obtained from fit database, 2007 (Year: 2007).*

(Continued)

*Primary Examiner* — Thomas C Diaz
(74) *Attorney, Agent, or Firm* — Stein IP, LLC

(57) ABSTRACT

A controller for vehicle air conditioner includes a base defining a mounting cavity; a knob assembly rotatably mounted to the base, wherein at least a portion of the knob assembly is located in the mounting cavity; and at least one bearing element arranged between the base and the knob assembly. Such a design reduces the friction between the base and the knob assembly and thus reduces the noise.

20 Claims, 19 Drawing Sheets

(56) References Cited

U.S. PATENT DOCUMENTS

| | | | |
|---|---|---|---|
| 2005/0113013 A1* | 5/2005 | Hentschel | B60H 1/0065 |
| | | | 454/69 |
| 2012/0249315 A1 | 10/2012 | Vanhelle et al. | 340/425.5 |
| 2015/0160683 A1* | 6/2015 | Fust | G05G 5/05 |
| | | | 74/490.12 |

FOREIGN PATENT DOCUMENTS

| | | |
|---|---|---|
| EP | 1 536 303 A2 | 6/2005 |
| EP | 1795990 A1 * 6/2007 | ............ B60K 37/06 |

OTHER PUBLICATIONS

Extended European Search Report dated Sep. 29, 2022, issued to counterpart European Application No. 20745658.3.

\* cited by examiner

CONTROLLER FOR VEHICLE AIR CONDITIONER

CROSS-REFERENCE TO RELATED APPLICATIONS

This application is a continuation of International Application No. PCT/CN2020/072515, filed on Jan. 16, 2020, which claims priority to Chinese Patent Application No. 201910053241.5, filed on Jan. 21, 2019. The disclosures of the aforementioned applications are hereby incorporated by reference in their entireties.

TECHNICAL FIELD

The present invention relates to the field of vehicles, and in particular to a controller for vehicle air conditioner.

BACKGROUND

With the rapid development of industry, the consumers' pursuit of comfort in vehicle environment for driving and riding has become a concern that the vehicle manufacturers pay more and more attention to. The main operating parts of an air conditioner controller generally include buttons and knobs. The knobs are mainly configured to adjust the temperature and the air volume, which are frequently used in the driving process. The design of the knobs not only needs to meet the customer's requirements on the torque, but also needs to take into account of the noise generated during its rotation. In a controller for vehicle air conditioner, when the knob rotates, direct friction is caused between the surfaces of the knob and the base which are opposite to each other, and a large friction force causes a large noise during operation of the knob.

SUMMARY

In view of this, there is a need to provide a controller for vehicle air conditioner to obviate or at least mitigate the above problem.

The present invention provides a controller for vehicle air conditioner, which includes a base defining a mounting cavity; a knob assembly rotatably mounted to the base, wherein at least a portion of the knob assembly is located in the mounting cavity; and at least one bearing element disposed between the base and the knob component.

In the controller for vehicle air conditioner, the at least one bearing element is provided between the knob component and the base, so that direct friction between the knob component and the base is replaced with friction between the knob component and/or the base and the first bearing element, thus reducing the friction and the noise.

BRIEF DESCRIPTION OF THE DRAWINGS

FIG. 4b is a partially enlarged view of portion A in FIG. 4a.

FIG. 5b is a partially enlarged view of portion B in FIG. 5a.

DESCRIPTION OF THE EMBODIMENTS

Figure 1:
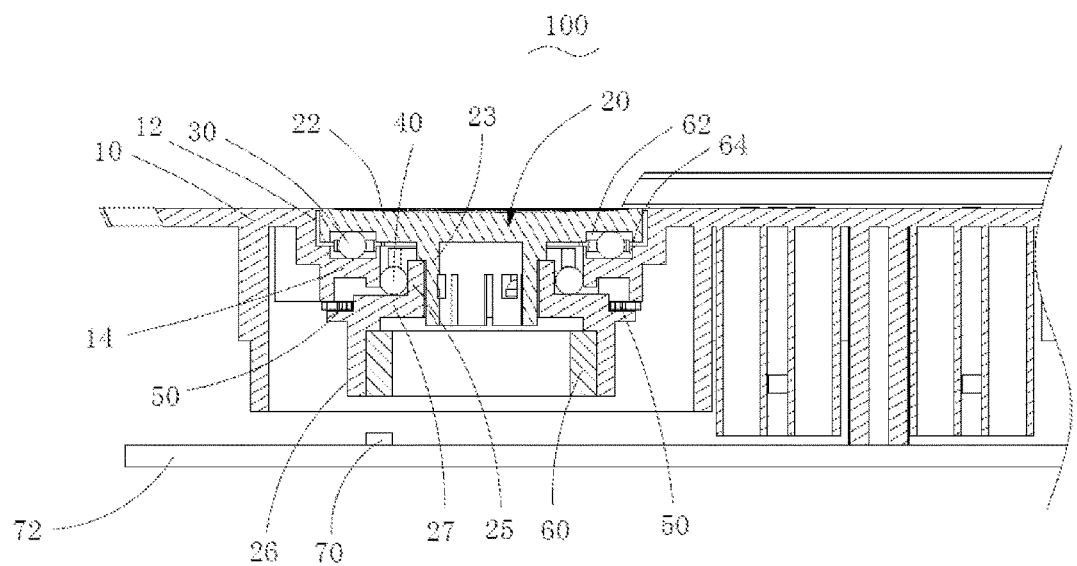
FIG. 1 is a structural schematic cross section of a controller for vehicle air conditioner according to a first embodiment of the present invention.

To make the technical solutions and advantages of the present invention more apparent, the present invention will be described in detail below with reference to accompanying drawings and specific embodiments. It is to be understood that the drawings are merely provided for reference and illustration and are not intended to limit the present invention. The dimensions shown in the drawings are only for the sake of clearly describing and do not limit the proportional relationship there among. In addition, it should be noted that in this application, the terms "upper, lower, left, right" and the like are determined based on the position relationship shown in the drawings referred to, and the relative position relationship may change according to different drawings, so that it cannot be deemed as limiting the scope of protection. Moreover, the relative terms such as "first" and "second" are only used to distinguish elements or components with the same name, and do not indicate or imply any such actual relationship or order between these elements or components.

Figure 2:
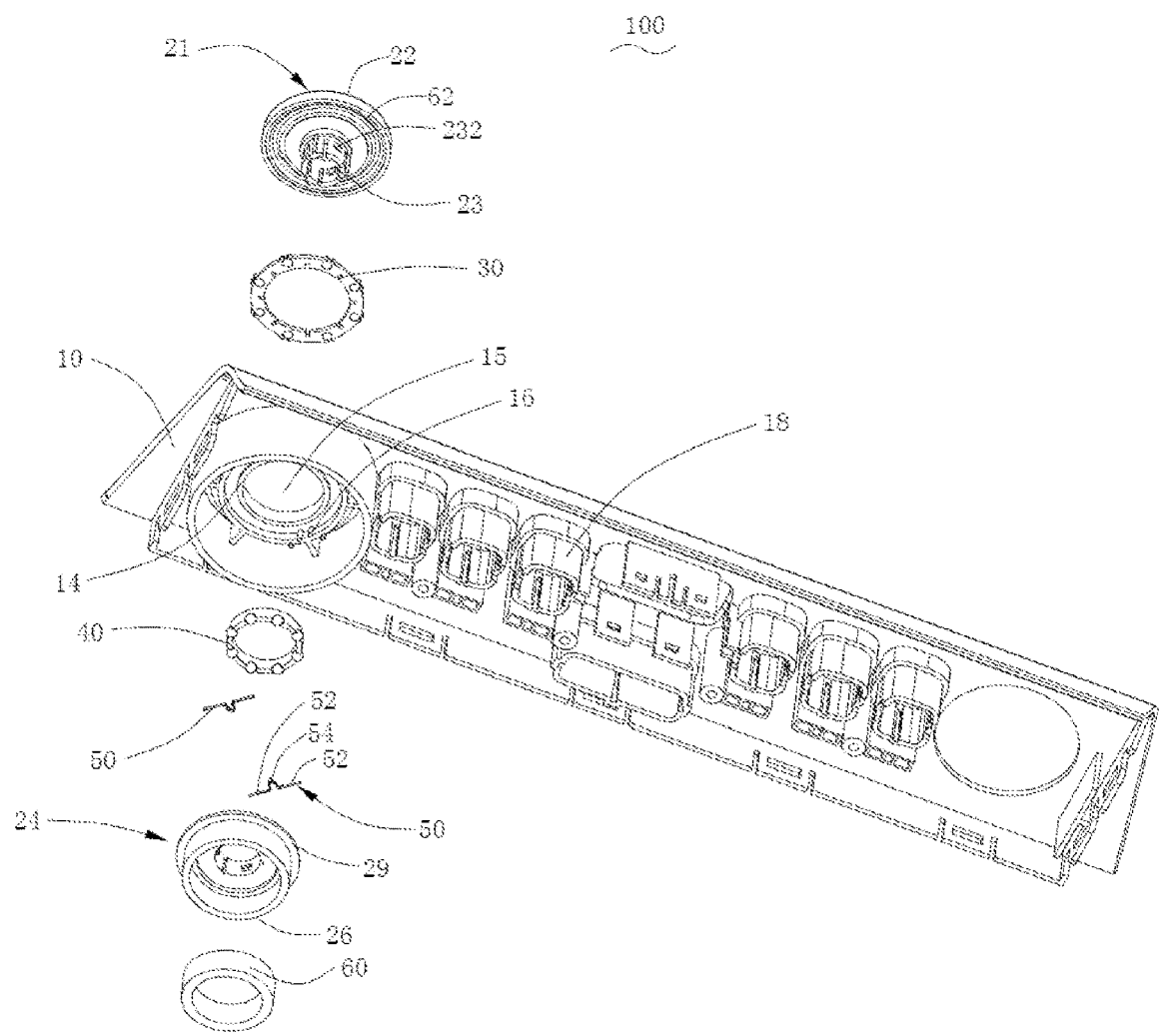
FIG. 2 is a structural schematic exploded perspective view of the controller for vehicle air conditioner shown in FIG. 1, viewed from one aspect, wherein a circuit board with electronic components thereon is omitted.
Figure 3:
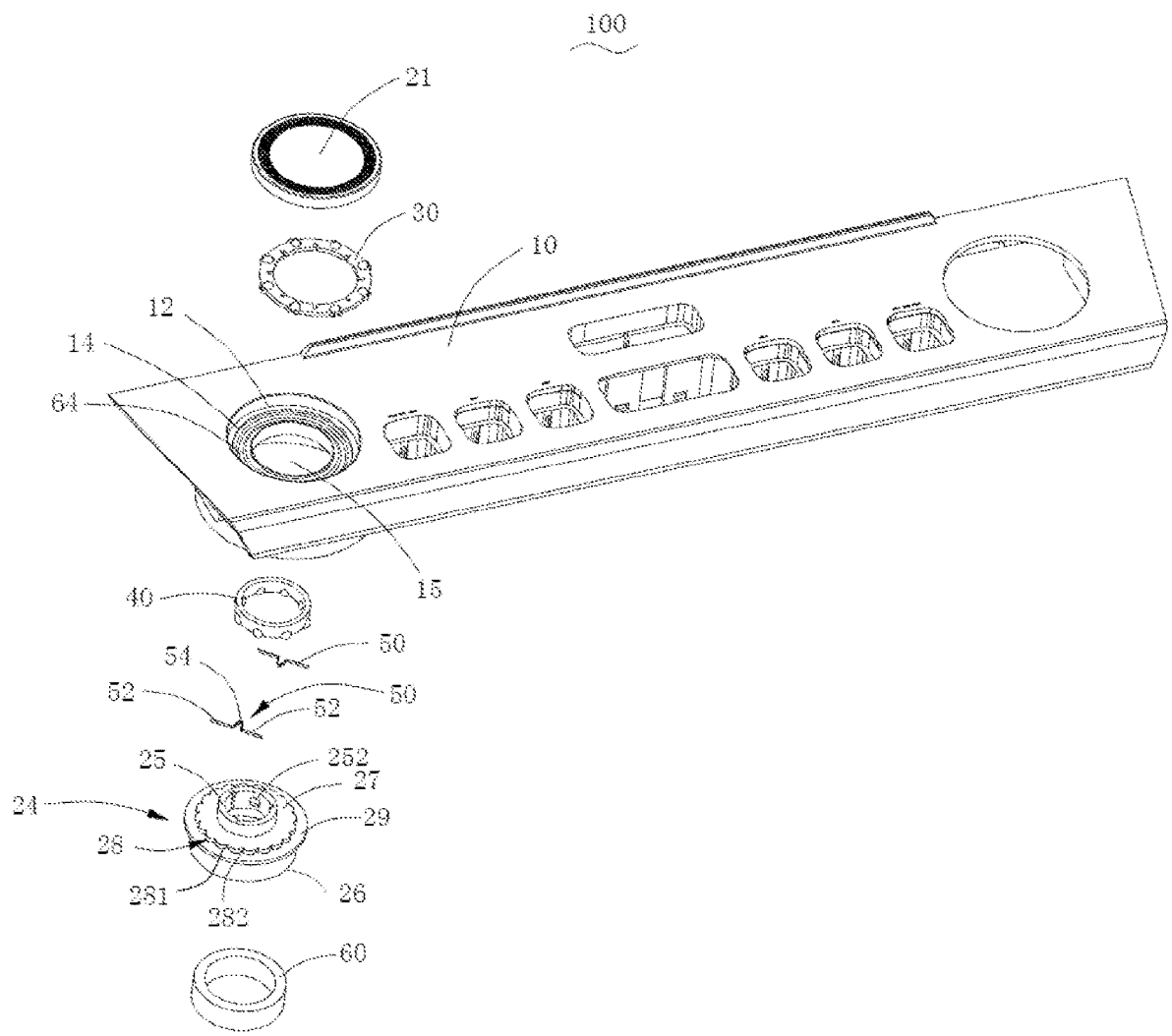
FIG. 3 is a structural schematic exploded perspective view of the controller for vehicle air conditioner shown in FIG. 2, viewed from another aspect.

Referring to FIGS. 1 to 3, a controller for vehicle air conditioner 100 according to a first embodiment of the present invention includes a base 10, a knob assembly 20 rotatably mounted in the base 10, and a first bearing element 30, a second bearing element 40, and spring elements 50 disposed between the base 10 and the knob assembly 20.

A mounting cavity 12 is formed in the base 10, and at least a portion of the knob assembly 20 is positioned in the mounting cavity 12. In this embodiment, an upper surface of the knob assembly 20 is substantially flush with the base 10. A support portion 14 is formed by extending radially inwardly from an inner wall of the mounting cavity 12. The support portion 14 is substantially annular. The base 10 defines a through hole 15 in the mounting cavity 12, which is enclosed by the support portion 14. The support portion 14 includes two end surfaces respectively located at two axial ends and an inner surface located at a radial inner side.

The knob assembly 20 includes a knob cap 21 and a shift portion 24. The knob cap 21 includes a flat body 22 and a connecting post 23 extending perpendicularly from one end surface of the body 22. In this embodiment, the body 22 is disc-shaped, and the connecting post 23 has a hollow tubular shape.

The shift portion 24 includes, along the axial direction, a first section 25 and a second section 26. Both the first section 25 and the second section 26 are hollow and cylindrical. The first section 25 has a diameter smaller than the diameter of the second section 26. The shift portion 24 further includes a shoulder 27 extending in the radial direction thereof, which is located between the first section 25 and the second section 26 and connects the first section 25 with the second section 26. In this embodiment, the shoulder 27 is in the form of a circular plate. The radial outer circumference of the shoulder 27 forms a shift ring 28. The shift ring 28 includes convex portions 281 and concave portions 282 which are circumferentially alternately arranged. The convex portions 281 protrude outwardly in the radial direction of the shift portion 24, and each concave portion 282 is formed between two adjacent convex portions 281.

In this embodiment, two spring elements 50 are provided. Each spring element 50 includes two fixing portions 52 and an engaging portion 54 connected between the two fixing portions 52. The spring element 50 can be formed as for example a leaf spring, by bending a metal sheet or a metal plate. In this embodiment, the two fixing portions 52 of the spring element 50 are flat and straight, arranged coplanar and spaced apart. Two ends of the engaging portion 54 are respectively connected to the two fixing portions 52, with the middle part of the engaging portion 54 protruding beyond one lateral side of the plane where the fixing portions 52 locate. In this embodiment, the engaging portion 54 is V-shaped. It is to be understood that in other embodiments, the fixing portion 52 is not limited to the flat and straight shape, and it may be curved, ring-shaped, or in any other shape that can be fixed to the base 10. The engaging portion is not limited to the V-shape, and it may be in a U-shape or other structures protruding from the fixing portions 52.

Figure 4A:
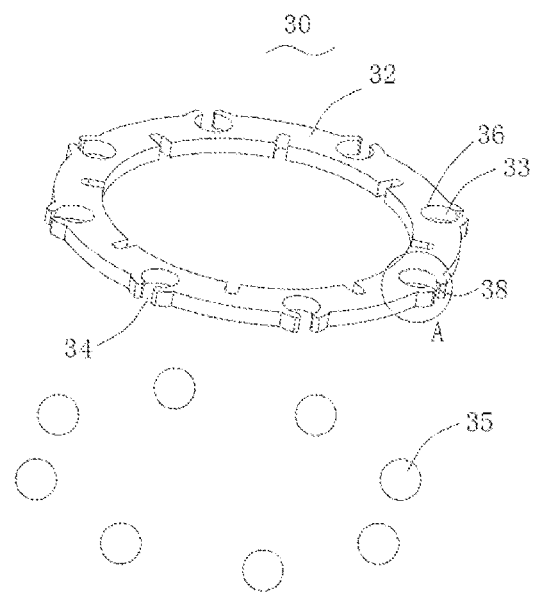
FIG. 4a is a structural schematic exploded perspective view of a first bearing element of the controller for vehicle air conditioner shown in FIG. 2.
Figure 4B:
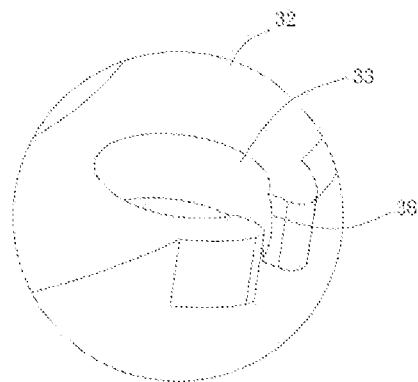

Referring to FIGS. 4a and 4b, the first bearing element 30 is a horizontal rolling bearing element, which includes a retaining ring 32 and a plurality of first rolling members 35 arranged in the retaining ring 32. The retaining ring 32 may be made of plastic, and the first rolling members 35 may be made of stainless steel. In this embodiment, the first rolling members 35 may be balls. The retaining ring 32 is ring-shaped, with a plurality of receiving holes 33 for receiving the first rolling members 35 provided thereon. The plurality of receiving holes 33 are evenly arranged in the circumferential direction of the retaining ring 32. Each receiving hole 33 extends through the retaining ring 32 in the axial direction of the retaining ring 32, with two first openings 36 formed on two end surfaces of the retaining ring 32, wherein only one of the first openings is shown. The wall 38 of the receiving hole 33 has a spherical shape. The receiving hole 33 has a maximum diameter at the axial middle portion of the retaining ring 32, and the diameter of the receiving hole 33 gradually decreases from the middle portion to the first openings 36 at two ends. The diameter of the first rolling member 35 is slightly smaller than the maximum diameter of the receiving hole 33, but larger than the diameter of the first openings 36 of the receiving hole 33. In particular, the diameter of the first rolling member 35 is smaller than the maximum hole diameter of the receiving hole about 0.1 mm, so that a small clearance is formed between the first rolling member 35 and the inner wall of the receiving hole 33. Therefore, the first rolling member 35 can be received in the receiving hole 33 and roll freely in the receiving hole 33 without falling off from the retaining ring 32. In addition, the diameter of the first rolling member 35 is greater than the axial thickness of the retaining ring 32. Thus, axial ends of the first rolling member 35 which is accommodated in the retaining ring 32 extend out from the first openings 36 and beyond the axial end surfaces of the retaining ring 32, respectively. In particular, the ratio of the axial thickness of the retaining ring 32 to the diameter of the first rolling member 35 is in the range of 50% to 75%. During assembly, the first rolling member 35 can be fitted into the receiving hole 33 from the first opening 36 by taking advantage of elastic deformation of the retaining ring 32. In order to facilitate the deformation of the retaining ring 32, the retaining ring 32 may be further provided with a plurality of slots 34. Each of the slots 34 runs through the radial outer edge of the retaining ring 32 and communicates with a corresponding receiving hole 33. The circumferential width of the slot 34 is less than the diameter of the first rolling member 35 to avoid the first rolling member 35 from being released from the retaining ring 32 via the slot 34.

In this application, the horizontal rolling bearing element is defined as a bearing element that includes a retaining ring and rolling members, wherein two axial ends of the rolling member protrude out from the axial ends of the retaining ring and act as the frictional contact areas.

Figure 5A:
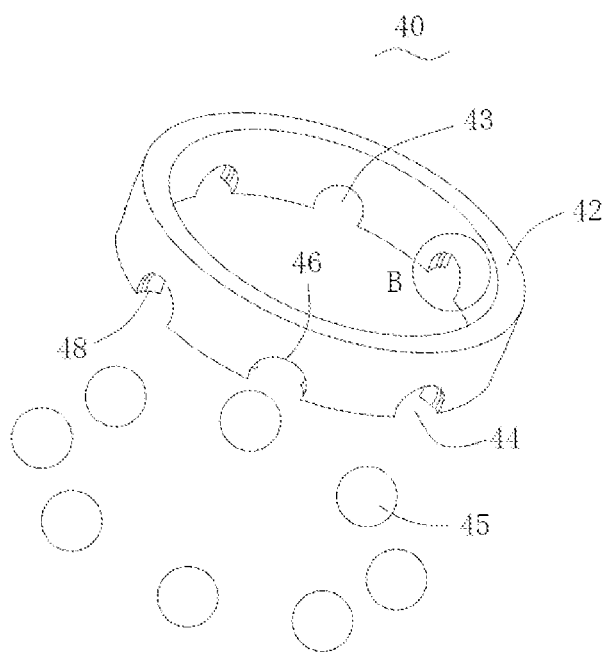
FIG. 5a is a structural schematic exploded perspective view of a second bearing element of the controller for vehicle air conditioner shown in FIG. 2.
Figure 5B:
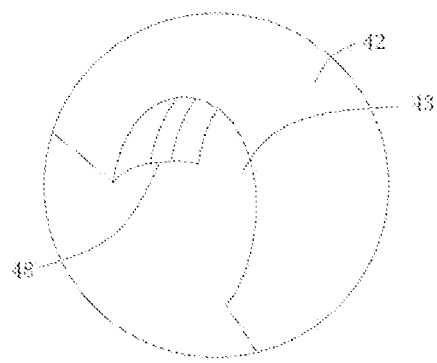

Referring to FIGS. 5a and 5b, the second bearing element 40 is a vertical rolling bearing element, which includes a retaining sleeve 42 and a plurality of second rolling members 45 arranged in the retaining sleeve 42. The retaining sleeve 42 may be made of plastic, and the second rolling members 45 may be made of stainless steel. In this embodiment, the second rolling members 45 may be balls. The retaining sleeve 42 includes a cylindrical body, with defines a plurality of accommodating holes 43 along the circumferential direction thereof for accommodating the second rolling members 45. The plurality of accommodating holes 43 are evenly arranged along the circumferential direction of the cylindrical body. Each accommodating hole 43 extends through the radially inner and outer surfaces of the retaining sleeve 42 in the radial direction to form two second openings 46 respectively. The inner wall 48 of the accommodating hole 43 is spherical. The accommodating hole 43 has a maximum diameter at the radial middle portion of the retaining sleeve 42, and the diameter of the accommodating hole 43 gradually decreases from the radial middle part of the retaining sleeve 42 to the second openings 46 at two radial sides. The diameter of the second rolling member 45 is slightly smaller than the maximum diameter of the accommodating hole 43, but larger than the diameter of the two second openings 46 of the accommodating hole 43. In particular, the diameter of the second rolling member 45 is about 0.1 mm smaller than the maximum diameter of the accommodating hole 43, so that a small clearance is formed between the second rolling member 45 and the inner wall of the accommodating hole 43. Therefore, the second rolling members 45 can be accommodated in the accommodating holes 43 and roll freely therein without falling off from the retaining sleeve 42. In addition, the diameter of the second rolling member 45 is greater than the radial thickness of the retaining sleeve 42, and two radial sides of the second rolling member 45 which is accommodated in the retaining sleeve 42 extends out from the second openings 46 and beyond the radial outer surface and the radial inner surface of the retaining sleeve 42 respectively. In particular, the ratio of the radial thickness of the retaining sleeve 42 to the diameter of the second rolling member 45 is in the range of 50% to 75%. In order to facilitate the elastic deformation of the retaining sleeve 42 to facilitate the assembling of the second rolling members 45, the accommodating hole 43 extends through the bottom end surface of the retaining sleeve 42 to form a notch 44 at the bottom end surface of the retaining sleeve 42. The notch 44 has a size smaller than the diameter of the second rolling member 45, to avoid the second rolling member 45 from being released from the retaining sleeve 42 via the notch 44.

In this application, the vertical rolling bearing element is defined as a bearing element that includes a retaining sleeve and rolling members, wherein two radial sides of the rolling member protrude out from the radial inner surface and radial outer surface of the retaining sleeve respectively and act as the frictional contact areas.

Referring again to FIGS. 1 to 3, in this embodiment, the knob cap 21 is placed in the mounting cavity 12 of the base 10, with the body 22 of the knob cap 21 located on the support portion 14, and the connecting post 23 extending through the through hole 15. Define that the knob cap 21 is to be installed along a direction from a position above the base 10 towards the base 10, then the shift portion 24 is to be installed along a direction from a position below the base 10 towards the base 10. The first section 25 of the shift portion 24 is mounted around the outer periphery of the connecting post 23, so that an anti-rotation connection is established between the knob cap 21 and the shift portion 24. In this embodiment, the first section 25 of the shift portion 24 and the connecting post 23 of the knob cap 21 is connected by fitting an engaging protrusion to an engaging hole. Specifically, as shown in FIGS. 2 and 3, a plurality of engaging protrusions 252 are formed on the inner peripheral surface of the first section 25. Engaging holes 232 are formed on the side wall of the connecting post 23 corresponding to the engaging protrusions 252. When the knob cap 21 and the shift portion 24 are assembled, the engaging protrusions 252 are engaged in the engaging holes 232 respectively, thereby restricting rotation of the knob cap 21 relative to the shift portion 24, allowing the knob cap 21 to drive the shift portion 24 to rotate together.

In this embodiment, the spring elements 50 are fixed relative to the support portion 14. Specifically, the lower end of the support portion 14 is provided with two sets of clamping protrusions 16 respectively corresponding to the two spring elements 50. Each spring element 50 is clamped by one set of clamping protrusions 16, whereby the spring element 50 is fixedly connected to the support portion 14. The two spring elements 50 are symmetrically arranged on two sides of the shift portion 24. Specifically, each set of clamping protrusions 16 include four protrusions, which are arranged in two rows. The two protrusions in the middle portion are arranged in a row and relatively closer to the radial inner side of the mounting cavity 12, and the two protrusions on two lateral sides are arranged in a row and relatively closer to the radial outer side of the mounting cavity 12. The two protrusions in the middle portion are spaced apart to form a first gap, and each of the two protrusions on the two lateral sides is spaced apart from a respective adjacent protrusion in the middle portion to form a second gap. The two fixing portions 52 of each spring element 50 are engaged into the two second gaps of the corresponding set of clamping projections 16 respectively, and the engaging portion 54 of the spring element 50 passes through the first gap of the clamping projection 16 along the radial direction of the mounting cavity 12 and extends inwardly to the shift ring 28 of the shift portion 24, Namely, the engaging portion 54 extends into the concave portion.

When the knob assembly 20 is rotated, the convex portion 281 of the shift ring 28 press the engaging portion 54 of the spring element 50 to enable the engaging portion 54 deformed. Therefore, when the engaging portion 54 slides over the convex portions 281 and the concave portions 282 of the shift ring 28, a stepping feel required during the rotation of the knob assembly 20 is formed. To prevent or reduce the position deviation of the spring element 50 in the axial direction caused by deformation of the engaging portion 54 of the spring element 50 due to pressing of the convex portion 281 of the shift ring 28, the shift portion 24 further includes a stop flange 29, which is located between the shift ring 28 and the second section 26 and having an outer diameter larger than the outer diameter of the shift ring 28. After assembly, the stop flange 29 of the shift portion 24 is located below the engaging portion 54 of the spring element 50, for supporting the spring element 50, to prevent or reduce the position deviation of the spring element 50 in the axial direction caused by deformation of the engaging portion 54 of the spring element 50 due to pressing by the convex portion 281 of the shift ring 28.

At least a portion of the upper end surface of the support portion 14 of the base 10 is located opposite to at least a portion of the lower end surface of the body 22 of the knob cap 21. The first bearing element 30 is located between the upper end surface of the support portion 14 and the lower end surface of the body 22 of the knob cap 21, with the upper and lower ends of the first rolling members 35 contacting the lower end surface of the body 22 of the knock cap 21 and the upper end surface of the support portion 14 respectively. In this embodiment, each of the lower end surface of the body 22 of the knob cap 21 and the upper end surface of the support portion 14 is provided with an annular groove 62, 64. The two annular grooves 62, 64 are aligned with each other, to partially receive the first rolling members 35. The annular grooves 62, 64 define a rolling track of the first rolling members 35 of the first bearing element 30 for retaining the first bearing elements 30, which is beneficial to improving the stability in the movement of the first rolling members 35 of the first bearing element 30 when the knob assembly 20 rotates. It is to be understood that in other embodiments, it is possible to provide only one annular groove, that is, only the upper end surface of the support portion 14 or the lower end surface of the body 22 of the knob cap 21 is provided with an annular groove, which can also limit the rolling of the first rolling member 35.

In addition, the radial inner surface of the support portion 14 of the base 10 is opposite to the radial outer surface of the first section 25 of the shift portion 24. In this embodiment, both the radial inner surface of the support portion 14 and the radial outer surface of the first section 25 of the shift portion 24 are vertical surfaces. The second bearing element 40 is arranged between the vertical radial inner and outer surfaces, with the radial outer sides and the radial inner sides of the second rolling members 45 of the second bearing element 40 respectively contacting the vertical radial inner and outer surfaces. In this embodiment, the bottom ends of the second rolling members 45 of the second bearing element 40 abut against the shoulder 27 of the shift portion 24.

Due to the arrangement of the first bearing element 30, direct friction of the opposed friction surfaces between the support portion 14 of the base 10 and the knob cap 21 of the knob assembly 20 is replaced with rolling friction between the two opposed surfaces and the first bearing element 30, thereby reducing the noise. Likewise, due to the arrangement of the second bearing element 40, direct friction of the opposed friction surfaces between the support portion 14 of the base 10 and the shift portion 24 of the knob assembly 20 is replaced with rolling friction between the two opposed surfaces and the second bearing element 40, which further reduces the noise. In addition, due to the first bearing element 30 and/or the second bearing element 40, a reserved clearance between the base 10 and the knob assembly 20 in the circumferential direction and/or the axial direction can be eliminated, thereby reducing the amplitude of shaking when the knob assembly 20 rotates, and improving the coaxiality of the mounting cavity 12 of the base 10 and the knob assembly 20.

In order to further reduce the friction, a lubricating oil may be applied to the friction surfaces of the base and knob assembly. The lubricating oil can reduce the wear of the friction surfaces and increase the life span of the controller for vehicle air conditioner.

In this embodiment, the rotation amount of the knob assembly 20 relative to the base 10 is measured by a detection magnet 60 and a Hall element 70. Specifically, the detection magnet 60 is ring-shaped, and is arranged on the inner wall of the second section 26 of the shift portion 24. The Hall element 70 is arranged on a circuit board 72, which is located below the shift portion 24. The detection magnet 60 has N poles and S poles which are alternately arranged in the circumferential direction. Therefore, when the detection magnet 60 rotates, the Hall element 70 detects a change of the polarity of the magnet 60, thereby achieving the measurement of the rotation amount of the knob assembly 20.

Figure 6:
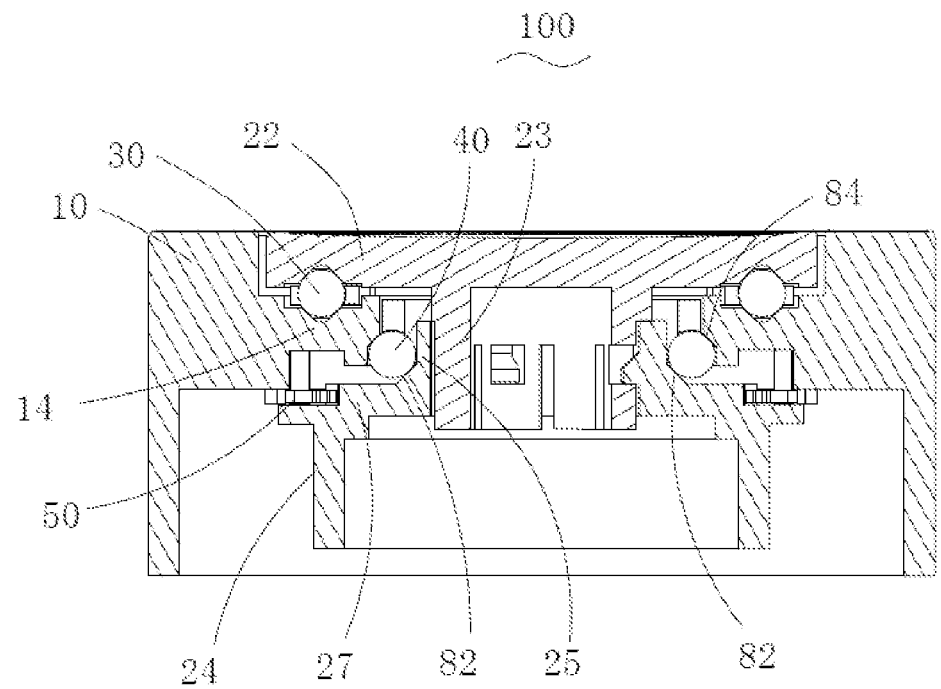
FIG. 6 is a structural schematic cross section of a controller for vehicle air conditioner according to a second embodiment of the present invention, wherein a circuit board with electronic components thereon is omitted.

FIG. 6 is a cross-sectional view of a controller for vehicle air conditioner 100 according to a second embodiment of the present invention. For the parts in this embodiment which are the same as those in the first embodiment, reference may be made to the descriptions provided above for the first embodiment, and will not be described hereinafter again. This embodiment is mainly different from the first embodiment in that, in the first embodiment, the junction between the radial outer surface of the first section 25 and the shoulder 27 of the shift portion 24 is at a right angle. That is, the radial outer surface of the first section 25 of the shift portion 24 is a vertical surface. The radial inner sides of the second rolling members 45 of the second bearing element 40 are in contact with the vertical surface. However, in this embodiment, the junction between the radial outer surface of the first section 25 and the shoulder 27 of the shift portion 24 includes an inclined surface 82. The second bearing element 40 is mounted around the inclined surface 82, and the radial inner sides of the second rolling members 45 of the second bearing element 40 are in contact with the inclined surface 82. In addition, the radial inner surface of the support portion 14 may also form an inclined surface 84, and the radial outer sides of the second rolling members 45 are in contact with the inclined surface 84. The inclined surfaces 82 and 84 can advantageously eliminate the lateral clearance caused by the manufacturing tolerance, improving the stability of the assembly of the shift portion 24, the support portion 14 and the second bearing element 40, avoiding the shaking of the second rolling members 45 of the second bearing element 40 caused by the manufacturing tolerance and further reducing the amount of shaking.

In this embodiment, the friction surfaces of the support portion 14 and the shift portion 24 for contacting the second rolling members 45 of the second bearing element 40 are inclined surfaces. It is to be understood that in other embodiments, the friction surface may be a curved surface, and the curved surface may be a concave curved surface or a convex curved surface.

Figure 7:
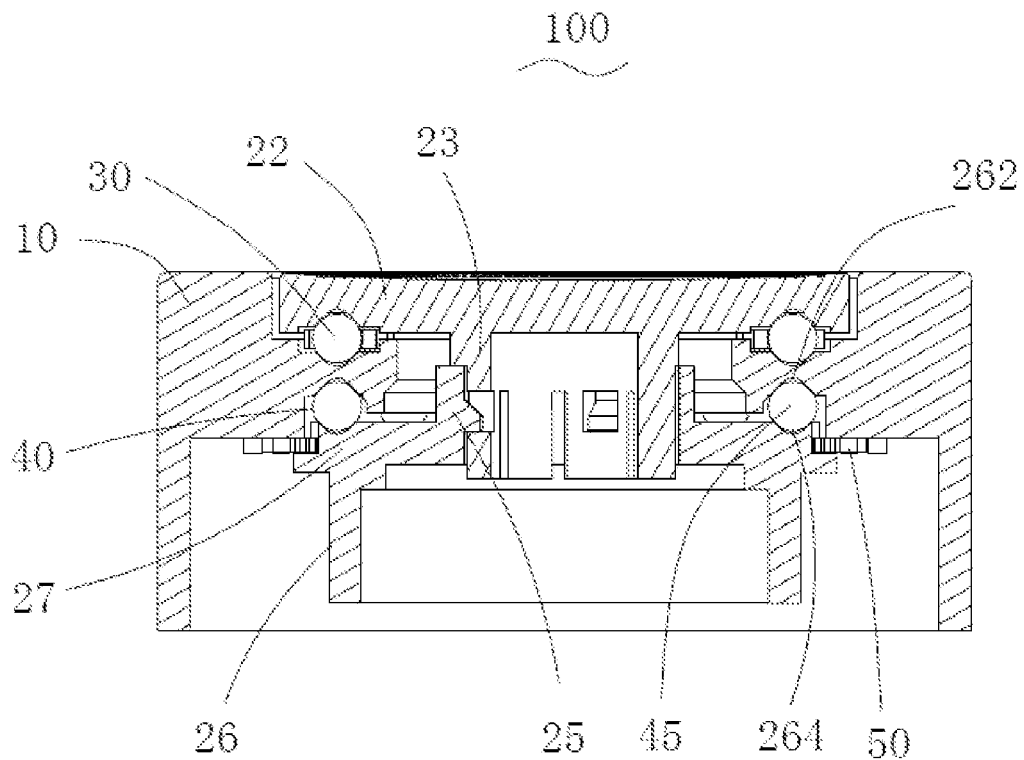
FIG. 7 is a structural schematic cross section of a controller for vehicle air conditioner according to a third embodiment of the present invention, wherein a circuit board with electronic components thereon is omitted.
Figure 8:
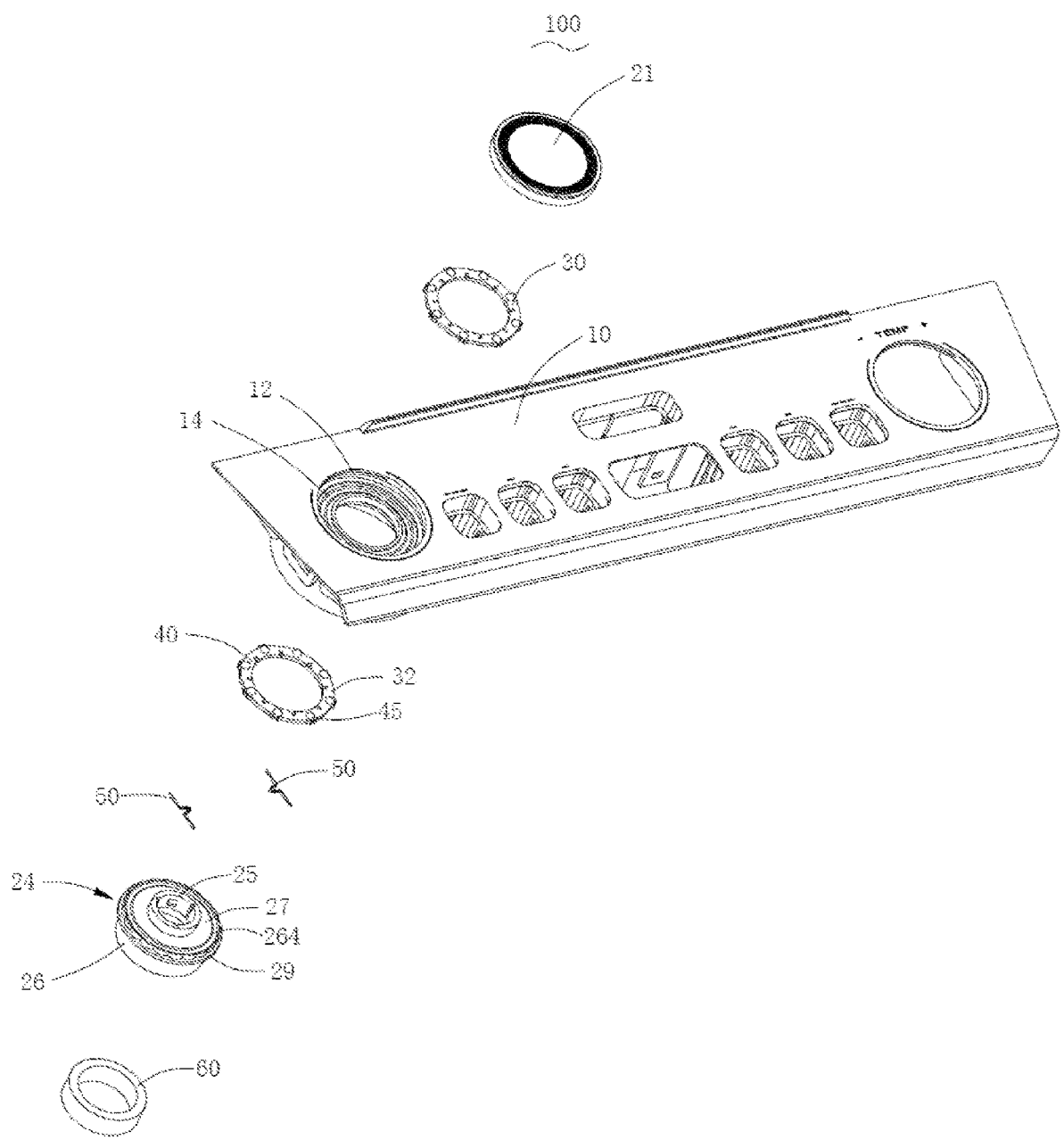
FIG. 8 is a structural schematic exploded perspective view of the controller for vehicle air conditioner shown in FIG. 7.

FIGS. 7 and 8 show a controller for vehicle air conditioner 100 according to a third embodiment of the present invention. For the parts in this embodiment which are the same as those in the first embodiment, reference may be made to the descriptions provided above for the first embodiment, and will not be described hereinafter again. This embodiment is mainly different from the first embodiment in that, in the first embodiment, the second bearing element 40 is a vertical rolling bearing element, whilst in this embodiment, the second bearing element 40 is a horizontal rolling bearing element, which has a structure the same as that of the first bearing element 30. The second bearing element 40 includes a retaining ring 32 and second rolling members 45 retained in the retaining ring 32. Two axial ends of the second rolling member 45 extend beyond the two axial ends of the retaining ring 32 respectively. For the specific structure of the second bearing element 40 in this embodiment, reference can be made to the descriptions provided for the first bearing element 30 in the first embodiment. The second bearing element 40 is located between the lower end surface of the support portion 14 and the upper end surface of the shoulder 27 of the shift portion 24, and the two axial ends of the second rolling members 45 serve as friction areas to contact the lower end surface of the support portion 14 and the upper end surface of the shoulder 27, respectively. Specifically, the lower end surface of the support portion 14 and the upper end surface of the shoulder 27 of the shift portion 24 each are provided with an annular groove 262 or 264, and the two annular grooves 262, 264 are aligned with each other, to partially receive the second rolling members 45 of the second bearing element 40. The two annular grooves 262, 264 define a rolling track of the second rolling members 45 of the second bearing element 40. The arrangement of the annular grooves 262, 264 limits the positions of the second rolling members 45, which is beneficial to improve the stability in the movement of the second rolling members 45 of the second bearing element 40 when the knob assembly 20 rotates. It is to be understood that in other embodiments, it is possible that only the lower end surface of the support portion 14 or the upper end surface of the shoulder 27 of the shift portion 24 is provided with an annular groove, which can also limit the rolling of the second rolling member 45.

Figure 9:
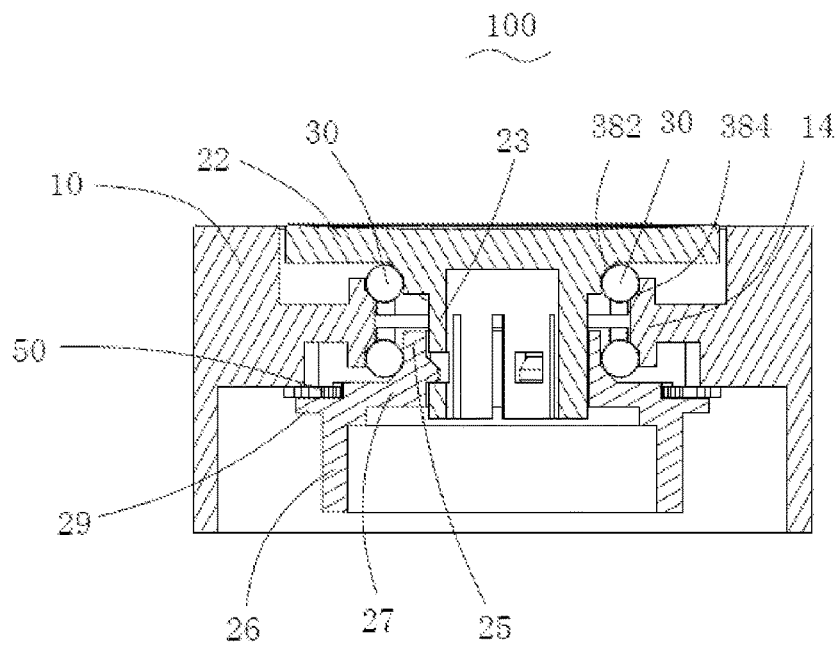
FIG. 9 is a structural schematic cross section of a controller for vehicle air conditioner according to a fourth embodiment of the present invention, wherein a circuit board with electronic components thereon is omitted.
Figure 10:
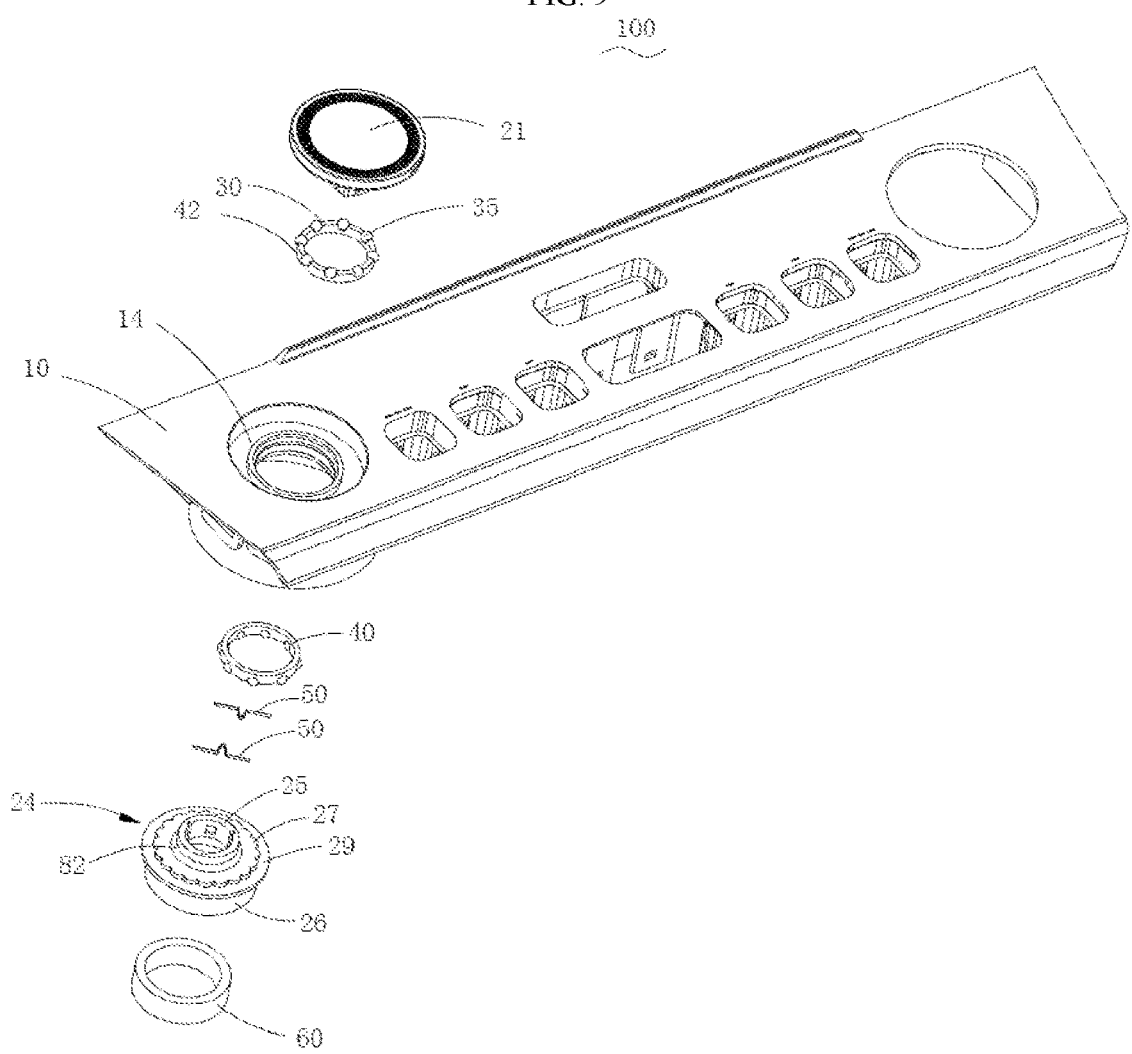
FIG. 10 is a structural schematic exploded perspective view of the controller for vehicle air conditioner shown in FIG. 9.

FIGS. 9 and 10 show a controller for vehicle air conditioner 100 according to a fourth embodiment of the present invention. This embodiment is similar to the second embodiment. For the parts which are the same as those in the second embodiment, reference may be made to the descriptions provided above for the second embodiment in combination with the first embodiment, and will not be described hereinafter again. This embodiment is mainly different from the second embodiment in that, in the second embodiment, the first bearing element 30 is a horizontal bearing element, whilst in this embodiment, the first bearing element 30 is a vertical rolling bearing element having the same structure as that of the second bearing element 40 in the first embodiment. The first bearing element 30 includes a retaining sleeve 42 and first rolling members 35 arranged in a top end of the retaining sleeve 42. two radial sides of the first rolling member 35 extends beyond the radial inner surface and the radial outer surface of the retaining sleeve 42 respectively. For the specific structure of the first bearing element 30 in this embodiment, reference may be made to the descriptions provided above for the second bearing element 40 in the first embodiment. In this embodiment, the first bearing element 30 is provided between the radial inner surface of the support portion 14 and the radial outer surface of the connecting post 23 of the knock cap 21. The radial outer side and the radial inner side of the first rolling member 35 serve as friction areas to respectively contact the radial inner surface of the support portion 14 and the radial outer surface of connecting post 23 of the knob cap 21. In particular, the radial outer surface of the connecting post 23 is provided with an inclined surface 382, and the radial inner surface of the support portion 14 is also provided with an inclined surface 384. The inclined surfaces 382, 384 are inclined relative to the axial direction, and are provided for frictional contacting the radial inner sides and the radial outer sides of the first rolling members 35 of the first bearing element 30, respectively.

In this embodiment, the friction surfaces of the radial outer surface of the connecting post 23 and the radial inner surface of the support portion 14 are inclined surfaces. It is to be understood that in other embodiments, the friction surface may be a curved surface, and the curved surface may be a concave curved surface or a convex curved surface.

Figure 11:
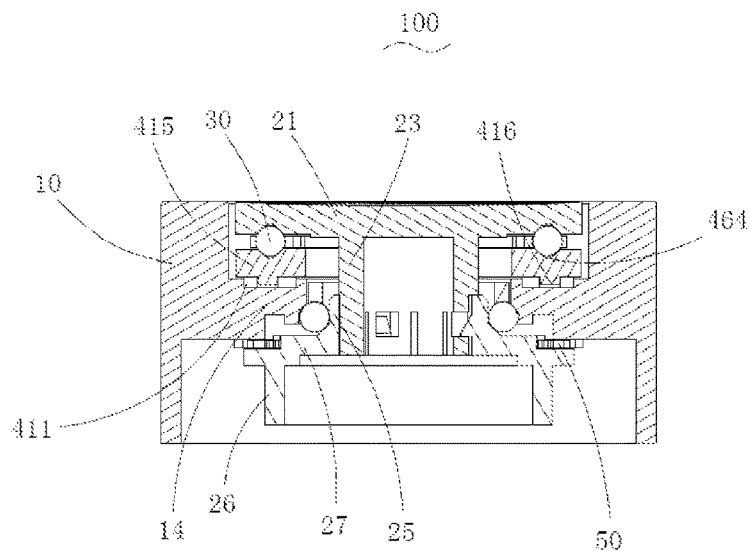
FIG. 11 is a structural schematic cross section of a controller for vehicle air conditioner according to a fifth embodiment of the present invention, wherein a circuit board with electronic components thereon is omitted.
Figure 13:
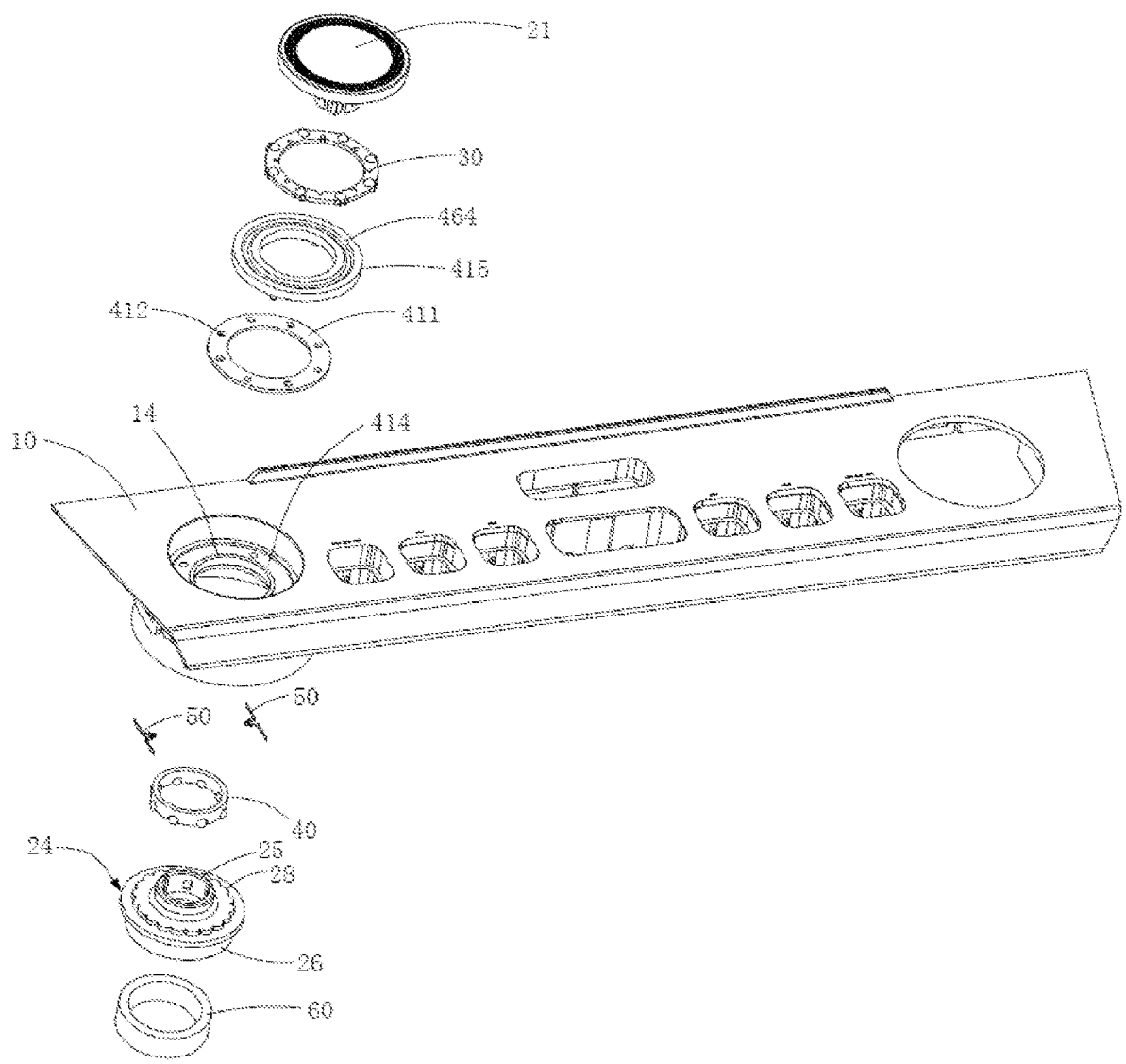
FIG. 13 is a structural schematic exploded perspective view of the controller for vehicle air conditioner shown in FIG. 12, viewed from another aspect.

FIGS. 11 and 13 show a controller for vehicle air conditioner 100 according to a fifth embodiment of the present invention. This embodiment is similar to the second embodiment. For the parts which are the same as those of the second embodiment, reference may be made to the descriptions provided above for the second embodiment in combination with the first embodiment, and will not be described hereinafter again. This embodiment is mainly different from the second embodiment in that, a buffer 411 and a holder 415 are further provided on the base 10 of this embodiment. The buffer 411 may be made of a material with high elasticity, such as rubber. In this embodiment, the material of the buffer 411 may be ethylene propylene diene monomer (EPDM) rubber. In other embodiments, the material of the buffer 411 may be ethylene-vinyl acetate copolymer (EVA). The holder 415 may be made of plastic, and has a hardness and a strength greater than those of the buffer 411. In this embodiment, the material of the holder 415 may be polyoxymethylene (POM).

The buffer 411 and the holder 415 are provided between the support portion 14 and the body 22 of the knob cap 21. The buffer 411 is supported on the support portion 14, and the holder 415 is supported on the buffer 411. The upper surface of the holder 415 faces the lower end surface of the body 22 of the knob cap 21. The first bearing element 30 is placed between the upper surface of the holder 415 and the lower end surface of the body 22. In particular, the upper surface of the holder 415 is formed with an annular groove 464 for defining the rolling track of the first rolling members 35 of the first bearing element 30. Since the buffer 411 is easy to be deformed when pressed, such that it is able to absorb the axial clearance caused by manufacturing tolerances, thereby improving the coaxiality of the mounting cavity 12 and the knob assembly 20.

Specifically, the buffer 411 is in the shape of an annular sheet, and has a plurality of fitting holes 412 along the circumferential direction. The holder 415 is ring-shaped, and has a thickness greater than that of the buffer 411. The holder 415 is provided with a plurality of fitting posts 416 corresponding to the fitting holes 412, and the buffer 411 and the holder 415 are connected and positioned by the fitting of the fitting holes 412 and the fitting posts 416. It is to be understood that the connection between the buffer 411 and the holder 415 is not limited to the fitting of the fitting holes 412 and the fitting posts 416. In other embodiments, the buffer and the holder may be provided with an annular rib and an annular receiving groove respectively that fit with each other, or only a receiving groove is provided on the holder for receiving an upper portion of the buffer. In addition, the upper surface of the support portion 14 is further provided with a receiving groove 414 for partially receiving the buffer 411, and the buffer 411 is partially received in the receiving groove 414 and protrudes out from the receiving groove 414.

In this embodiment, the buffer 411 and the holder 415 are provided where the support portion 14 of the base 10 is located. It is to be understood that in other embodiments, the buffer 411 and the holder 415 may be provided where the body 22 of the knock cap 21 is located. In that case, the buffer is supported on the body of the knob cap, and the holder is support on the buffer. The holder faces the support portion of the base, and the first rolling bearing element is placed therebetween. In that case, the lower end of the holder and/or the upper end of the support portion may be provided with an annular groove to stabilize the movement of the first rolling members of the first rolling bearing element. In addition, a receiving groove for partially receiving the buffer may be provided on the body of the knob cap.

In the above embodiments, the base 10 may be directly formed by a front panel of the controller for vehicle air conditioner. That is, the base 10 and the front panel are integrally formed, and the base 10 is a non-detachable part of the front panel. The front panel is further provided with a plurality of button installation portions 18 thereon for installing buttons, see FIG. 2.

Figure 14:
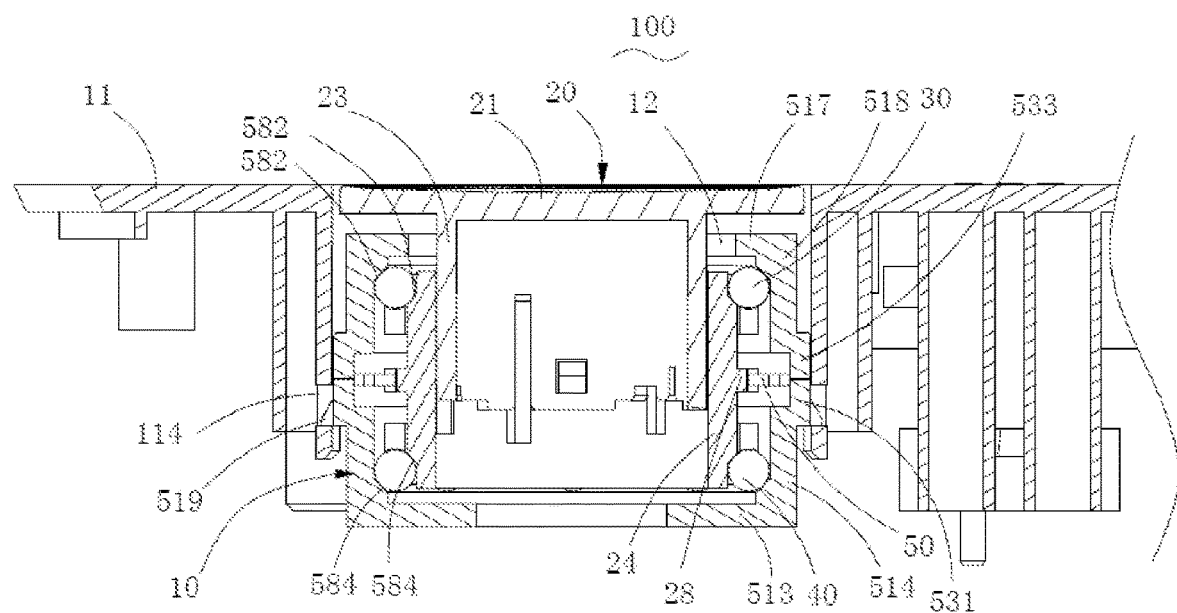
FIG. 14 is a structural schematic cross section of a controller for vehicle air conditioner according to a sixth embodiment of the present invention, wherein a circuit board with electronic components thereon is omitted.
Figure 15:
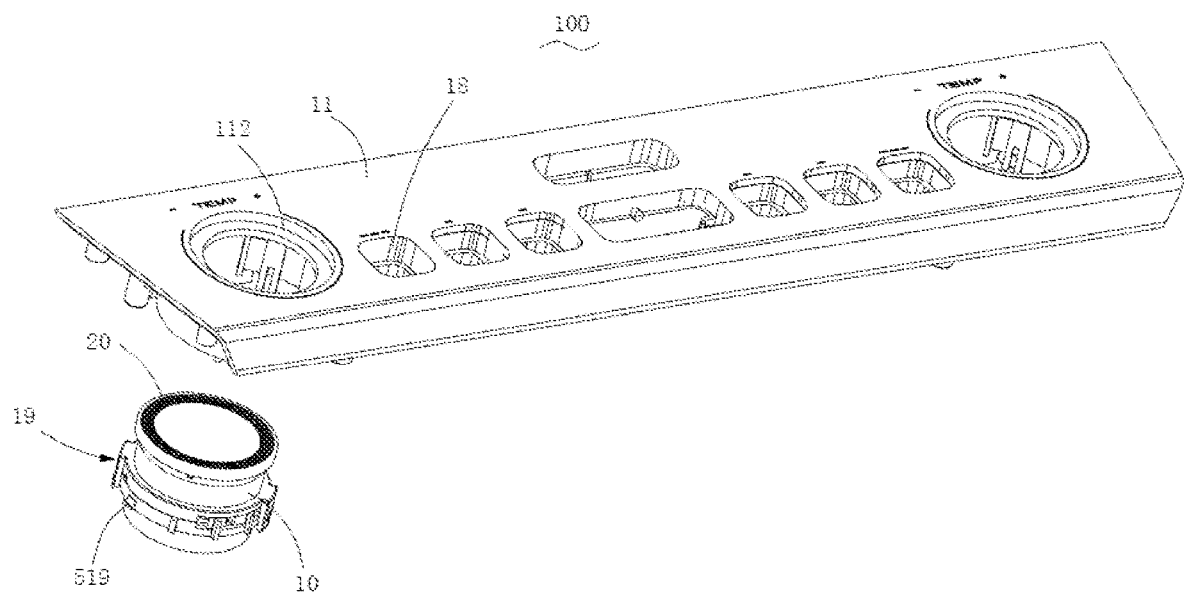
FIG. 15 is a structural schematic exploded perspective view of the controller for vehicle air conditioner shown in FIG. 14.

FIGS. 14 and 15 show a controller for vehicle air conditioner 100 according to a sixth embodiment of the present invention, which includes a front panel 11, a base 10 detachably mounted on the front panel 11, with a knob assembly 20, a first bearing element 30, a second bearing element 40 and two spring elements 50 mounted in the base 10. The knob assembly 20, the first bearing element 30, the second bearing element 40 and the two spring elements 50 are mounted in the base 10 and form, together with the base 10, as a pre-assembled component 19. A mounting hole 112 is formed in the front panel 11, and the pre-assembled component 19 is detachably mounted in the mounting hole 112 of the front panel 11. That is, in the controller for vehicle air conditioner of this embodiment, the pre-assembled component 19 is a separate element with respect to the front panel 11.

Figure 16:
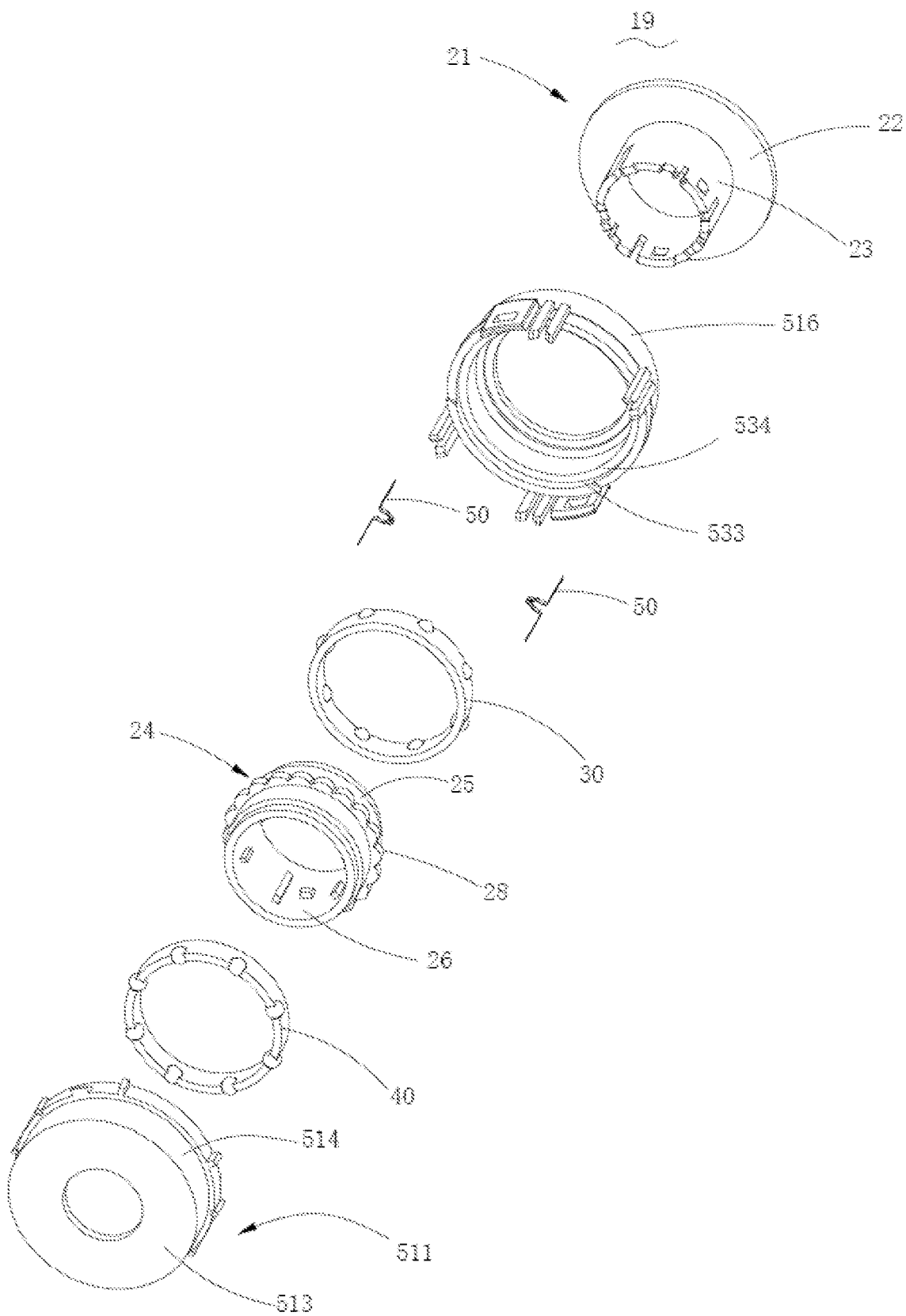
FIG. 16 is a structural schematic exploded perspective view of a pre-assembled component of the controller for vehicle air conditioner shown in FIG. 14, viewed from one aspect.
Figure 17:
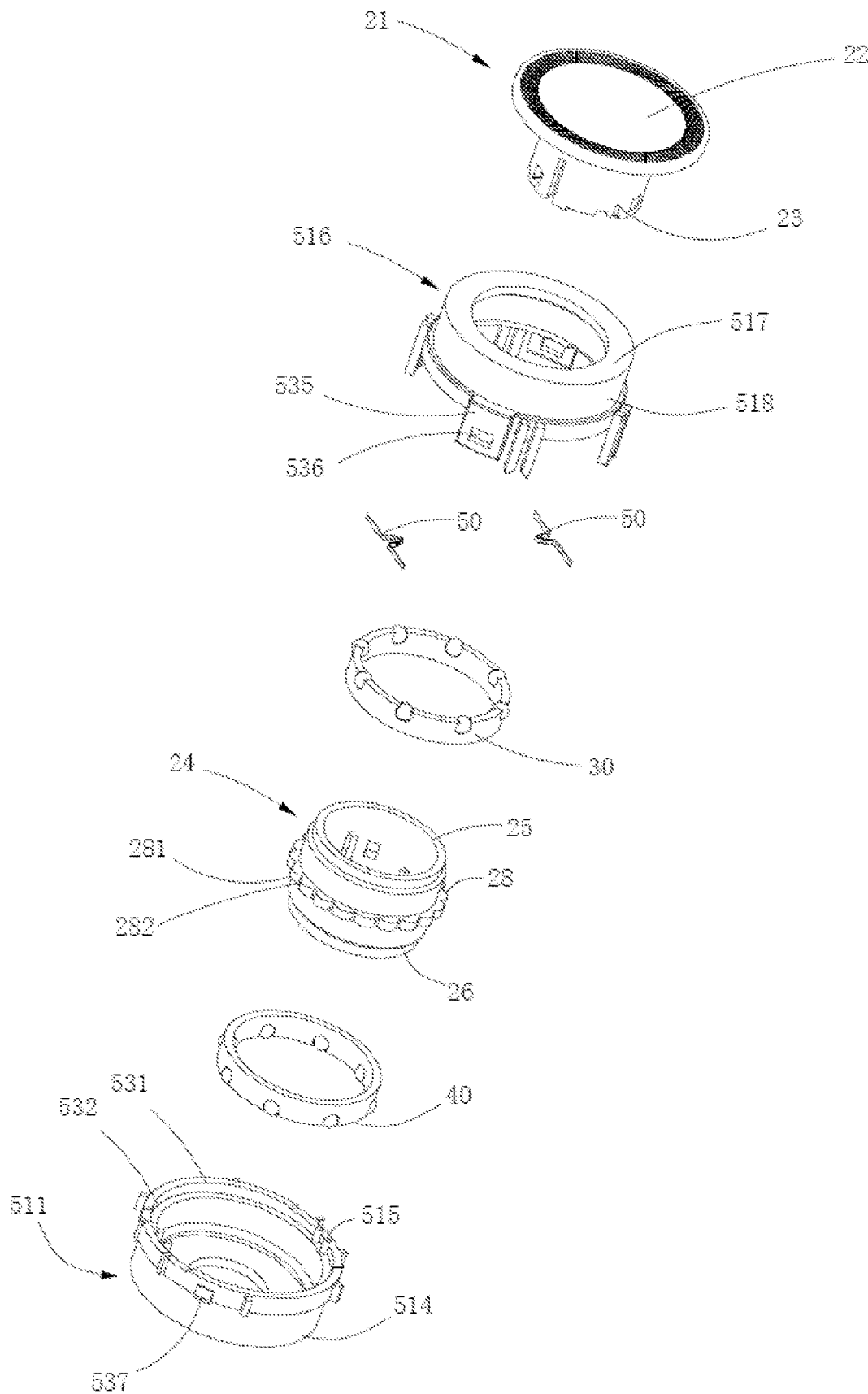
FIG. 17 is a structural schematic exploded perspective view of the pre-assembled component shown in FIG. 16, viewed from another aspect.
Figure 18:
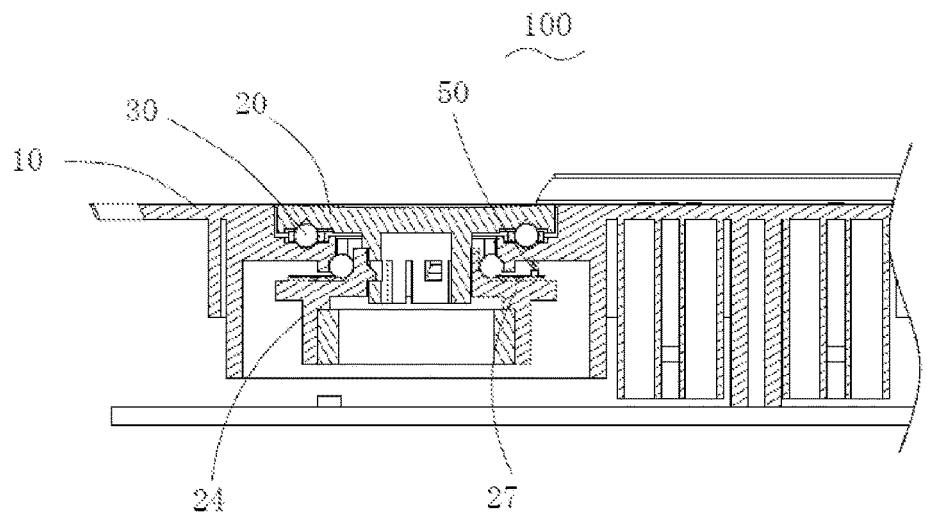
FIG. 18 is a structural schematic cross section of the structure of a controller for vehicle air conditioner according to a seventh embodiment of the present invention.
Figure 19:
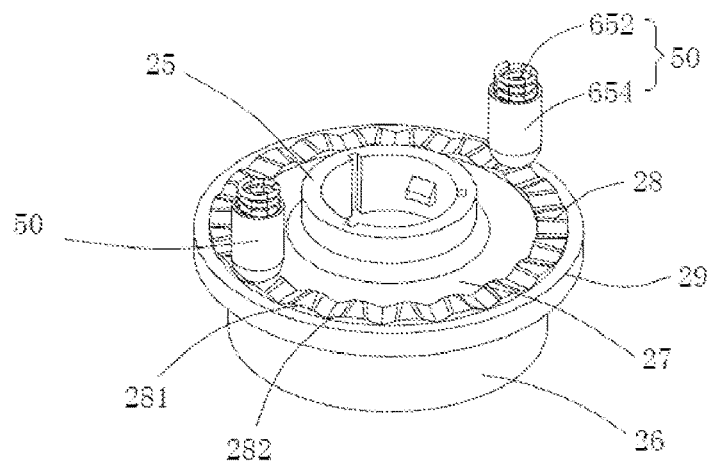
FIG. 19 is a structural schematic perspective view showing spring elements and a shift portion of the controller for vehicle air conditioner shown in FIG. 18.
Figure 20:
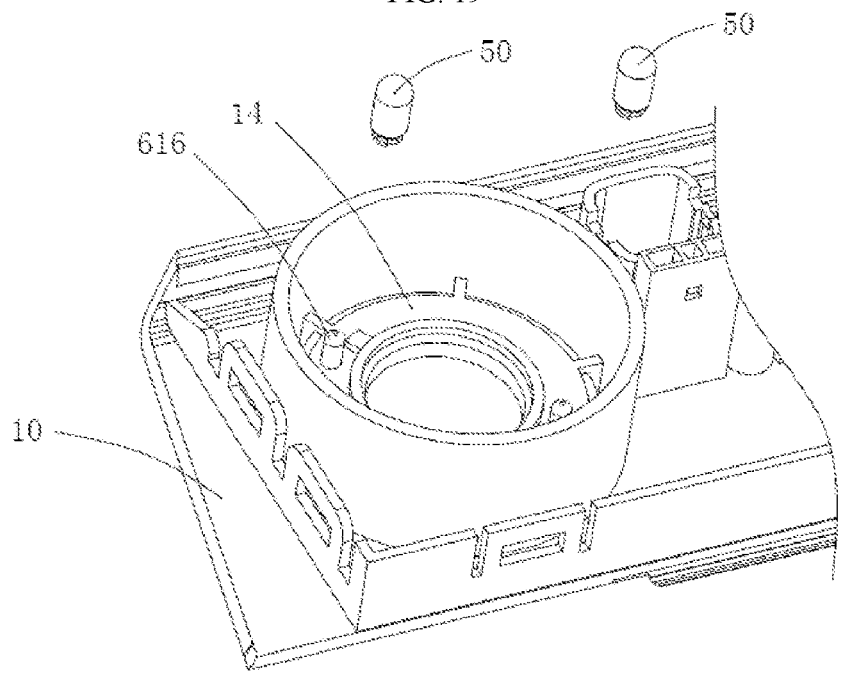
FIG. 20 is a structural schematic perspective view showing the spring elements and a base of the controller for vehicle air conditioner shown in FIG. 18.

Referring to FIGS. 16 and 17, specifically, the base 10 includes a housing 511 and a cover 516 that are detachably connected. The housing 511 and the cover 516 are connected with a mounting cavity 12 for mounting the knob assembly 20 formed therebetween. In this embodiment, the housing 511 and the cover 516 are connected to each other by snap-fit connection. The housing 511 includes a bottom wall 513 and a first side wall 514 extending vertically from the circumference of the bottom wall 513. A through hole is defined in the central portion of the bottom wall 513. The first side wall 514 is substantially cylindrical. The housing 511 further includes a first radial extension 531 located at a distal end of the first side wall 514 and having a diameter larger than the diameter of the first side wall 514. The first side wall 514 includes a first step surface 532, and the first step surface 532 and the first radial extension 531 are arranged in a step manner. The first step surface 531 is provided with clamping protrusions 515, and the spring elements 50 are clamped into the clamping protrusions 515. In this embodiment, two sets of protrusions 515 are provided corresponding to two spring elements 50 respectively. Each set includes two clamping protrusions 515, the two clamping protrusions 515 are spaced apart for clamping the engaging portion 54 of a respective spring element 50, and the two clamping protrusions 515 are spaced from the inner surface of the first radial extension 531 to clamp the fixing portions 52 of the respective spring element 50.

The cover 516 includes a top wall 517 and a second side wall 518 extending vertically from the circumference of the top wall 517. A through hole is defined in the central portion of the top wall 517. The second side wall 518 is substantially cylindrical. The cover 516 further includes a second radial extension 533 located at a distal end of the second side wall 518 and having a diameter larger than the diameter of the second side wall 518. The second side wall 518 includes a second step surface 534. The second side wall 518 and the first side wall 514 extend toward and are interconnected to each other.

The outer surfaces of the cover 516 and the housing 511 are provided with latching protrusions and latching holes which fit to each other to achieve connection and fixation therebetween. Specifically, in this embodiment, latching portions 535 are formed on the cover 516 extending toward the housing 511, each of which defines a latching hole 536 thereon, and latching protrusions 537 are formed on the housing 511 corresponding to the latching holes 536. It is to be understood that in other embodiments, the latching protrusions may be formed on the cover 516, and correspondingly, the engaging portions each having a latching hole are formed on the housing 511. Alternatively, the housing 511 and the cover 516 are connected by other ways, for example, the two are fixedly connected by fasteners.

In this embodiment, the first section 25 and the second section 26 of the shift portion 24 have substantially the same diameter, so the shoulder may not be provided. A shift ring 28 is formed on an outer periphery of the shift portion 24 at an axially middle portion thereof, extending radially and outwardly. The shift ring 28 is located at the junction of the first section 25 and the second section 26. For the specific structure of the shift ring 28, reference may be made to related descriptions in the first embodiment.

The first bearing element 30 and the second bearing element 40 in this embodiment are both vertical rolling bearing elements, and their specific structures are the same as the second bearing element 40 in the first embodiment. Therefore, reference may be made to the related descriptions above, and they will not be described in detail hereinafter again.

As shown in FIG. 14, during assembly, the shift portion 24 is received in the mounting cavity 12 enclosed by the housing 511 and the cover 516, the connecting post 23 of the knob cap 21 is inserted in the mounting cavity 12 via the through hole on the top wall 517 of the cover 516, and the shift portion 24 mounted around the outer periphery of connecting post 23. The shift ring 28 of the shift portion 24 is aligned with the first and second radial extensions 531, 533 of the housing 511 and the cover 516. Each spring element 50 is clamped to a corresponding set of clamping protrusions 515, and the engaging portion 54 of the spring element 50 protrudes to the shift ring 28 of the shift portion 24. The first bearing element 30 is provided between an upper radial outer surface of the shift portion 24 and the radial inner surface of the cover 516. Each of the radial outer surface of the shift portion 24 and the radial inner surface of the cover 516 are provided with a first inclined surface 582 for abutting the first rolling members 35 of the first bearing element 30, and the first inclined surface 582 is in frictional contact with the first rolling members 35. It is to be understood that the first inclined surface may be formed only on the upper radial outer surface of the shift portion 24 or only on the radial inner surface of the cover 516. The second bearing element 40 is provided between a lower radial outer surface of the shift portion 24 and the radial inner surface of the housing 511. In particular, each of the lower radial outer surface of the shift portion 24 and the radial inner surface of the housing 511 are provided with a second inclined surface 584 for abutting the second rolling members 45 of the second bearing element 40, and the second inclined surface 584 is in frictional contact with the second rolling members 45. It is to be understood that the second inclined surface 584 may be formed only on the lower radial outer surface of the shift portion 24 or only on the radial inner surface of the housing 511.

In this embodiment, the friction surfaces of the upper radial outer surface of the shift portion 24 and the radial inner surface of the cover 516 for contacting the first rolling members 35 of the first bearing element 30 are inclined surfaces. It is to be understood that the friction surface may be curved surfaces, and the curved surface may be a concave curved surface or a convex curved surface. In addition, the friction surfaces of the lower radial outer surface of the shift portion 24 and the radial inner surface of the housing 511 for contacting the second rolling member 45 of the second bearing element 40 may also be curved surfaces, and the curved surface may also be a concave curved surface or a convex curved surface.

In this embodiment, the base 10 and the knob assembly 20 are pre-assembled into a pre-assembled component 19. In this way, it only requires to reserve a mounting space or a mounting hole 112 on the front panel 11 of the controller for vehicle air conditioner. During assembly, the pre-assembled component 19 is fixed to the mounting space or mounting hole 112 of the front panel 11. Such modular design facilitates the assembling process of the automobile manufacturers and improves the compatibility in application of the controller for vehicle air conditioner 100 of the present invention.

Further, the pre-assembled component 19 may be mounted on the front panel 11 by snap-fitting. In particular, in this embodiment, the housing 511 may be provided with a fixing protrusion 519 on the outer surface thereof. Correspondingly, the front panel 11 is provided with a fixing hole 114 on an inner wall of the mounting hole 112 thereof. During assembly, the fixing protrusion 519 on the housing 511 of the pre-assembled component 19 is engaged in the fixing hole 114 of the front panel 11, such that the pre-assembled component 19 is mounted.

In the above embodiments, the spring elements 50 may be leaf springs. It is to be understood that the spring element is not limited to the leaf spring. For example, FIGS. 18 to 20, FIGS. 21 to 23, and FIGS. 24 to 26, illustrate various alternatives to the spring element. Specifically, in the embodiment shown in FIGS. 18 to 20, each spring element 50 of the controller for vehicle air conditioner 100 includes a spring 652 and a shift pin 654 located at a distal end of the spring 652. The spring 652 is a cylindrical compression spring. In particular, the lower end surface of the support portion 14 of the base 10 is provided with a fixing post 616, around which the spring 652 is mounted, and the shift pin 654 is connected to the lower end of the spring 652. Correspondingly, the shift ring 28 of the shift portion 24 is formed on the upper surface of the shoulder 27, and the convex portions 281 of the shift ring 28 protrude upwardly in the axial direction. After assembled, the shift pin 654 is urged to the concave portion 282 of the shift ring 28 by the spring 652, such that the spring 652 works cooperatively with the shift ring 28, with the spring 652 having a certain extent of compression. When the shift ring 28 rotates, the shift pin 654 moves from one concave portion 282 to another concave portion 282 via an adjacent convex portion 281, cooperative with the shift ring 28, to thereby cause a stepping feel required during rotation of the knob assembly 20. In particular, the distal end of the shift pin 654 has a smooth curved surface, which facilitates it slide over the convex portions 281 of the shift ring 28, avoiding noise due to significant friction.

Figure 21:
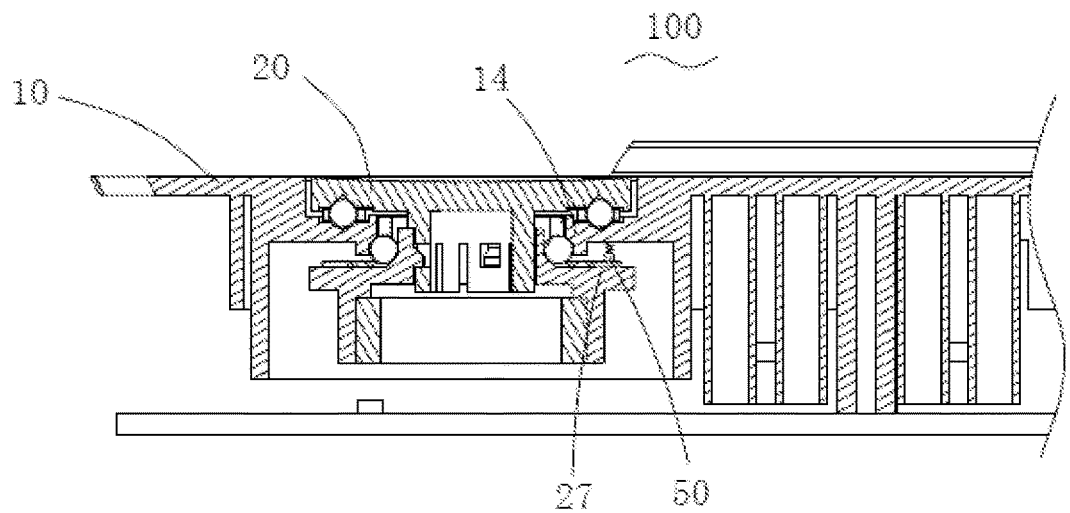
FIG. 21 is a structural schematic cross section of a controller for vehicle air conditioner according to an eighth embodiment of the present invention.
Figure 22:
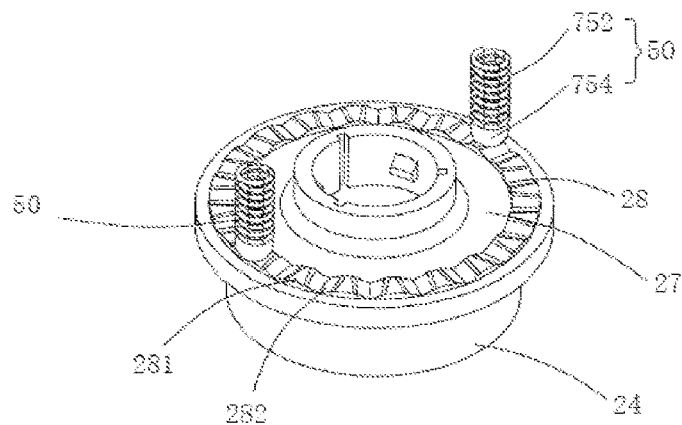
FIG. 22 is a structural schematic perspective view showing spring elements and a shift portion of the controller for vehicle air conditioner shown in FIG. 21.
Figure 23:
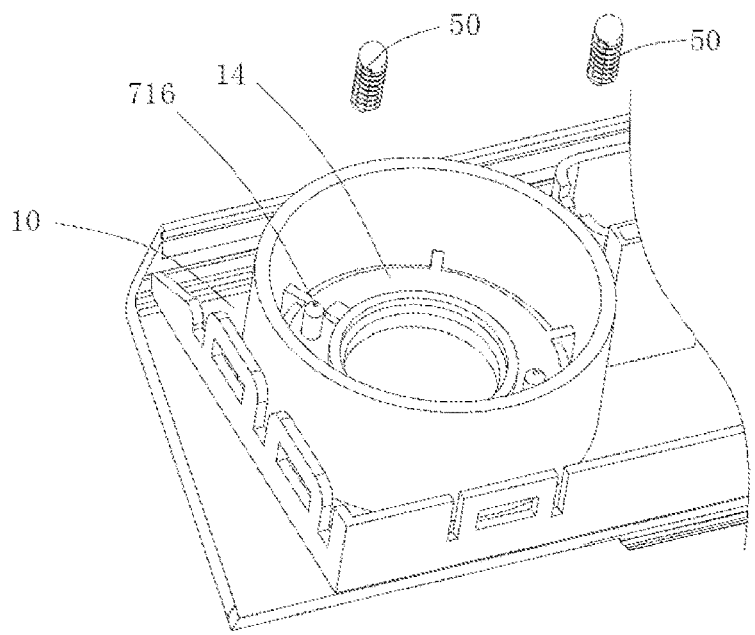
FIG. 23 is a structural schematic perspective view showing the spring elements and a base of the controller for vehicle air conditioner shown in FIG. 21.

In the controller for vehicle air conditioner 100 according to the embodiment shown in FIGS. 21 to 23, the shift ring 28 of the shift portion 24 is also provided on the upper surface of the shoulder 27, and the convex portions 281 of the shift ring 28 protrude upwardly in the axial direction. Each spring element 50 includes a spring 752 and a ball 754 located at a distal end of the spring 752. In particular, the lower end surface of the support portion 14 of the base 10 is provided with a fixing post 716, around which the spring 752 is mounted, and the ball 754 is provided at a lower end of the spring 752. After assembled, the ball 754 is urged to the concave portion 282 of the shift ring 28 by the spring 752, such that the spring works cooperatively with the shift ring, with the spring 752 having a certain extent of compression. When the shift ring 28 rotates, the ball 754 moves from one concave portion 282 to another concave portion 282 via an adjacent convex portion 281. Therefore, when the knob assembly 20 is rotated, the ball 754 works cooperatively with the shift ring 28 to form a stepping feel required during rotation of the knob assembly 20.

Figure 24:
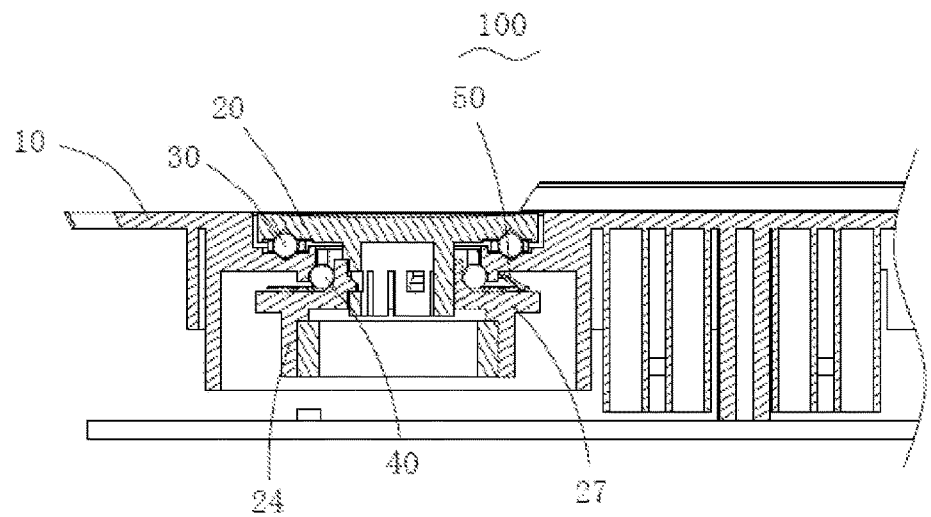
FIG. 24 is a structural schematic cross section of a controller for vehicle air conditioner according to a ninth embodiment of the present invention.
Figure 25:
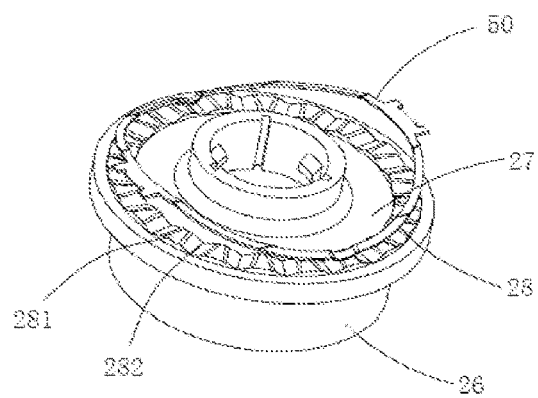
FIG. 25 is a structural schematic perspective view showing spring elements and a shift portion of the controller for vehicle air conditioner shown in FIG. 24.
Figure 26:
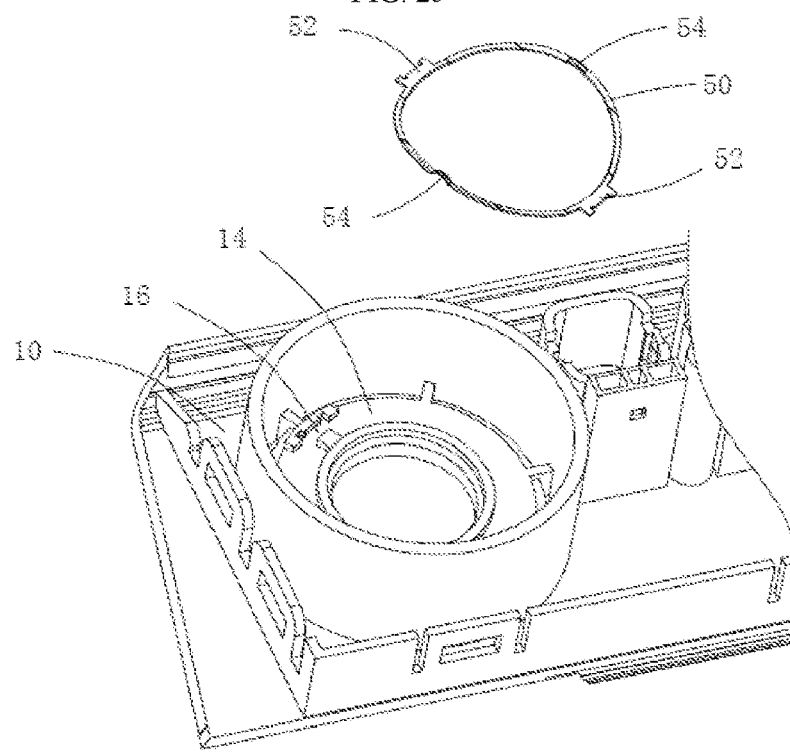
FIG. 26 is a structural schematic perspective view showing the spring elements and a base of the controller for vehicle air conditioner shown in FIG. 24.

In the controller for vehicle air conditioner 100 according to the embodiment shown in FIGS. 24 to 26, the shift ring 28 of the shift portion 24 is also provided on the upper surface of the shoulder 27, and the convex portions 281 of the shift ring 28 protrude upwardly in the axial direction. However, in this embodiment, the spring element 50 is a wave spring. The wave spring 50 may be annular, and provided with fixing portions 52 and engaging portions 54 along the circumferential direction. In this embodiment, two fixing portions 52 are provided, which are arranged symmetrically. Also, two engaging portions 54 are provided, which are also arranged symmetrically. The fixing portions 52 and the engaging portions 54 are alternately arranged in the circumferential direction. The lower end surface of the support portion 14 of the base 10 is provided with two sets of clamping protrusions 16 respective corresponding to the fixing portions 52. only one set is shown in the figure. In this embodiment, each set of clamping protrusions 16 is arranged in an M-shape manner. During assembly, the two fixing portions 52 of the wave spring 50 are respectively clamped into the two sets of clamping protrusions 16 so as to be fixed to the support portion 14. The engaging portions 54 of the wave spring 50 extend to the concave portions 282 of the shift ring 28 of the shift portion 24, and work cooperatively with the shift ring 28 when the knob assembly 20 is rotated, to produce a stepping feel required during rotation of the knob assembly 20.

In the controllers for vehicle air conditioners according to the embodiments shown in FIGS. 1, 18, 21, and 24, the rotation amount, i.e., a rotation angle, of the knob assembly is detected by a detection magnet 60 and a Hall element 70.

Figure 27:
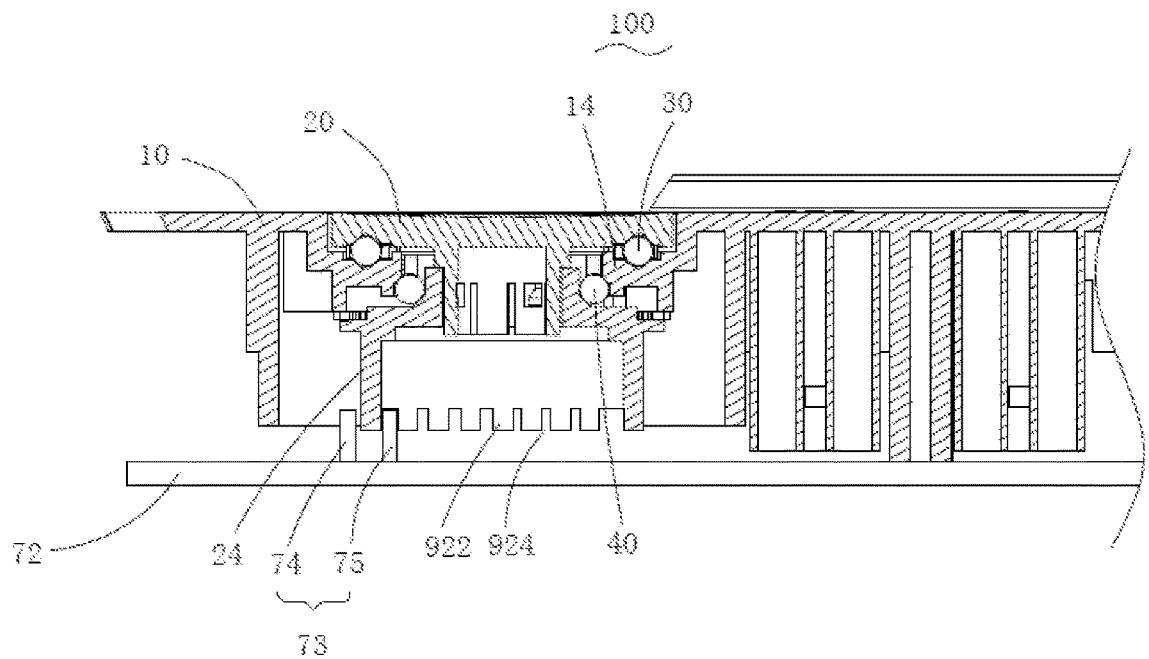
FIG. 27 illustrates a specific application example of the controller for vehicle air conditioner shown in FIG. 6.
Figure 28:
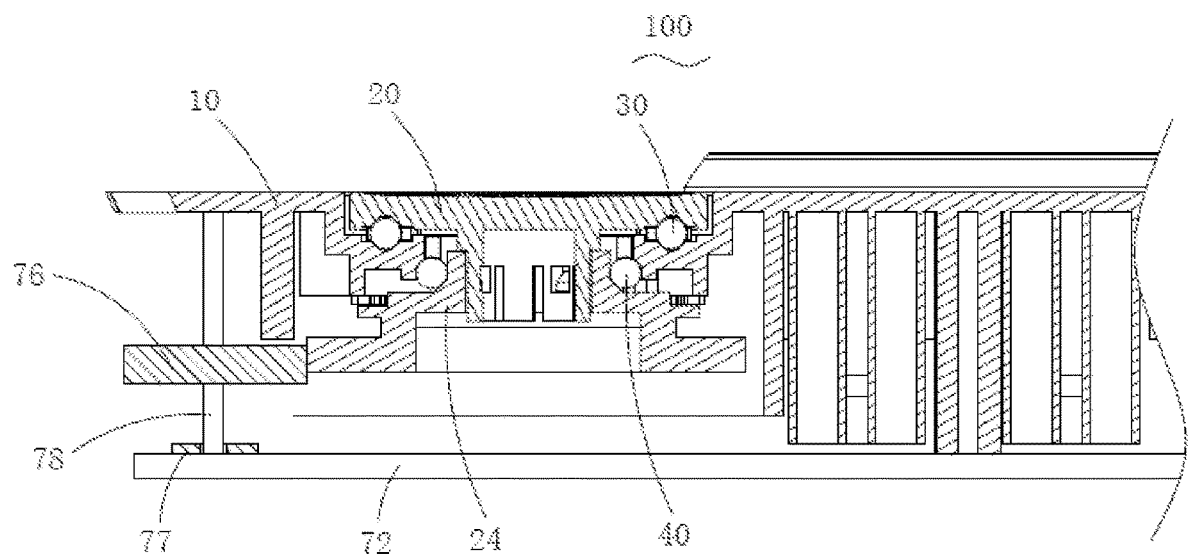
FIG. 28 illustrates another application example of the controller for vehicle air conditioner shown in FIG. 6.

FIGS. 27 and 28 show two alternatives. In the controller for vehicle air conditioner 100 according to the embodiment shown in FIG. 27, the shift portion 24 has a toothed ring 922 at its bottom end, which includes a plurality of notches 924. The notches 924 are arranged spaced apart along the circumferential direction of the shift portion 24. A photoelectric switch 73 is provided on a circuit board 72 below the shift portion 24 corresponding to the toothed ring 922. The photoelectric switch 73 includes a light emitter 74 and a light receiver 75, which are arranged opposite to each other and spaced apart with a gap therebetween. The light emitter 74 is arranged at a radial outer side of the toothed ring 922, and the light receiver 75 is arranged at a radial inner side of the toothed ring 922 facing the light emitter 74. When the knob assembly 20 is rotated, the notches 924 of the toothed ring 922 of the shift portion 24 travel through the gap between the light emitter 74 and the light receiver 75, and the toothed ring 922 alternately blocks and exposes the light emitted by the light emitter, whereby the rotation amount of the knob assembly 20 is measured by counting the number of notches 924 passing thereby. It is to be understood that in other embodiments, the positions of the light emitter and the light receiver can be exchanged. That is, the light receiver is arranged at a radial outer side of the toothed ring, and the light emitter is arranged at a radial inner side of the toothed ring facing the light receiver 74.

In the controller for vehicle air conditioner 100 according to the embodiment shown in FIG. 28, the outer periphery at the bottom of the shift portion 24 is engaged with a gear 76. The circuit board 72 is provided with a potentiometer 77, which may be a chip potentiometer. The gear 76 is connected to a rotatable shaft 78 of the potentiometer 77. Therefore, the rotation of the knob assembly 20 drives the gear 76 to rotate, and in turn drives the rotation shaft 78 to rotate together, so that the rotation amount of the knob assembly 20 is measured by the potentiometer 77.

Figure 29:
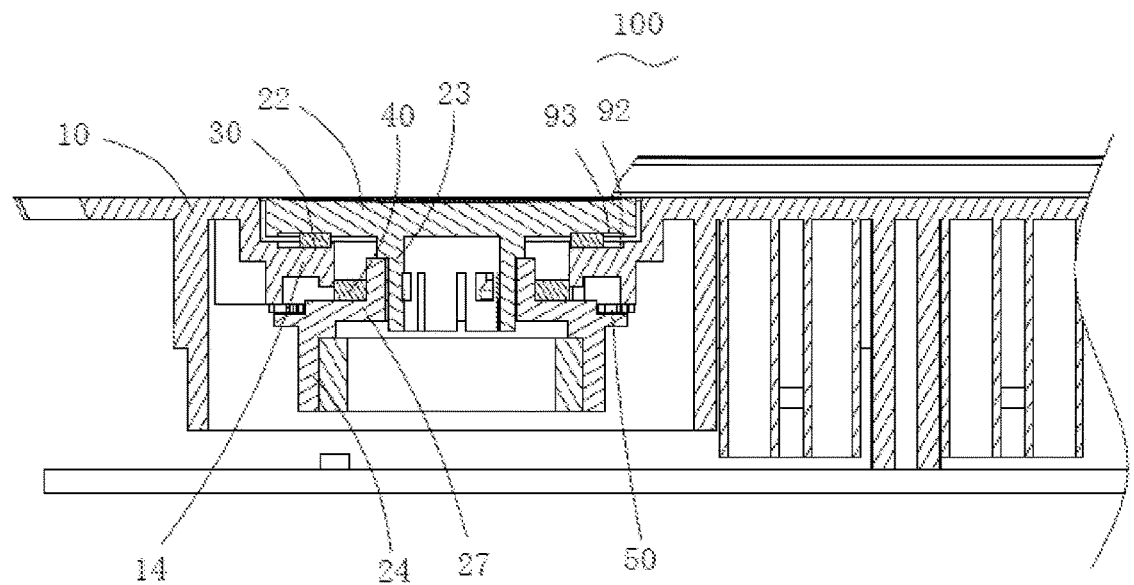
FIG. 29 is a structural schematic cross section of a controller for vehicle air conditioner according to a tenth embodiment of the present invention.
Figure 30:
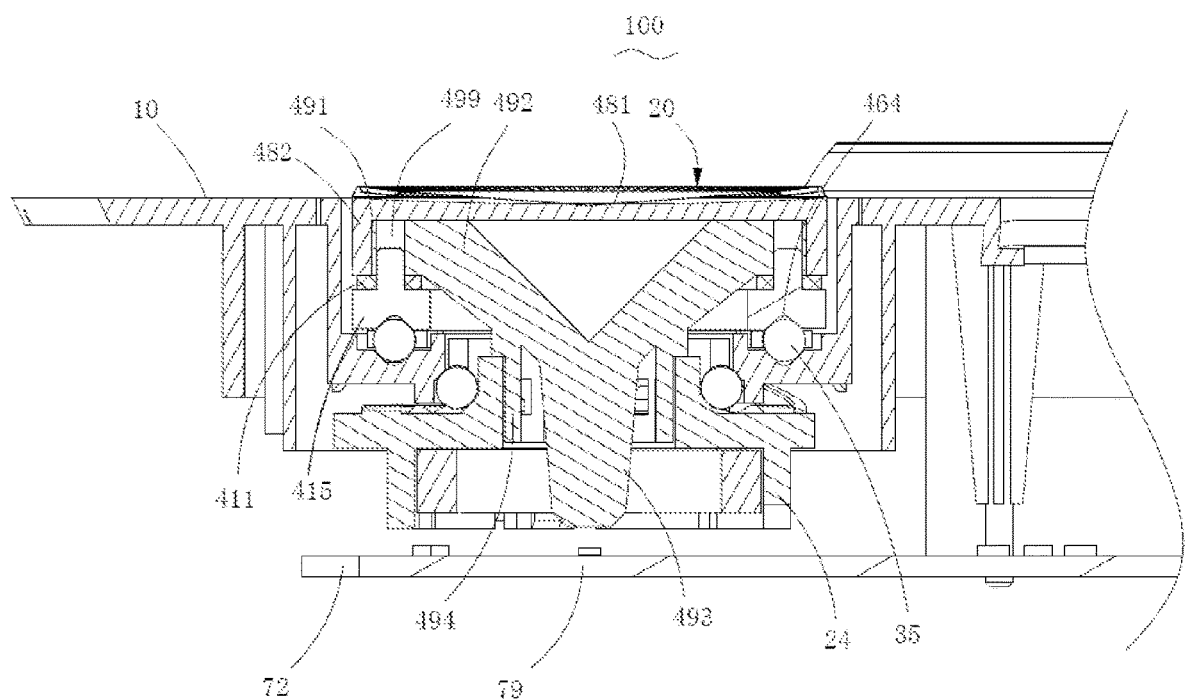
FIG. 30 is a structural schematic cross section of a controller for vehicle air conditioner according to an eleventh embodiment of the present invention.
Figure 31:
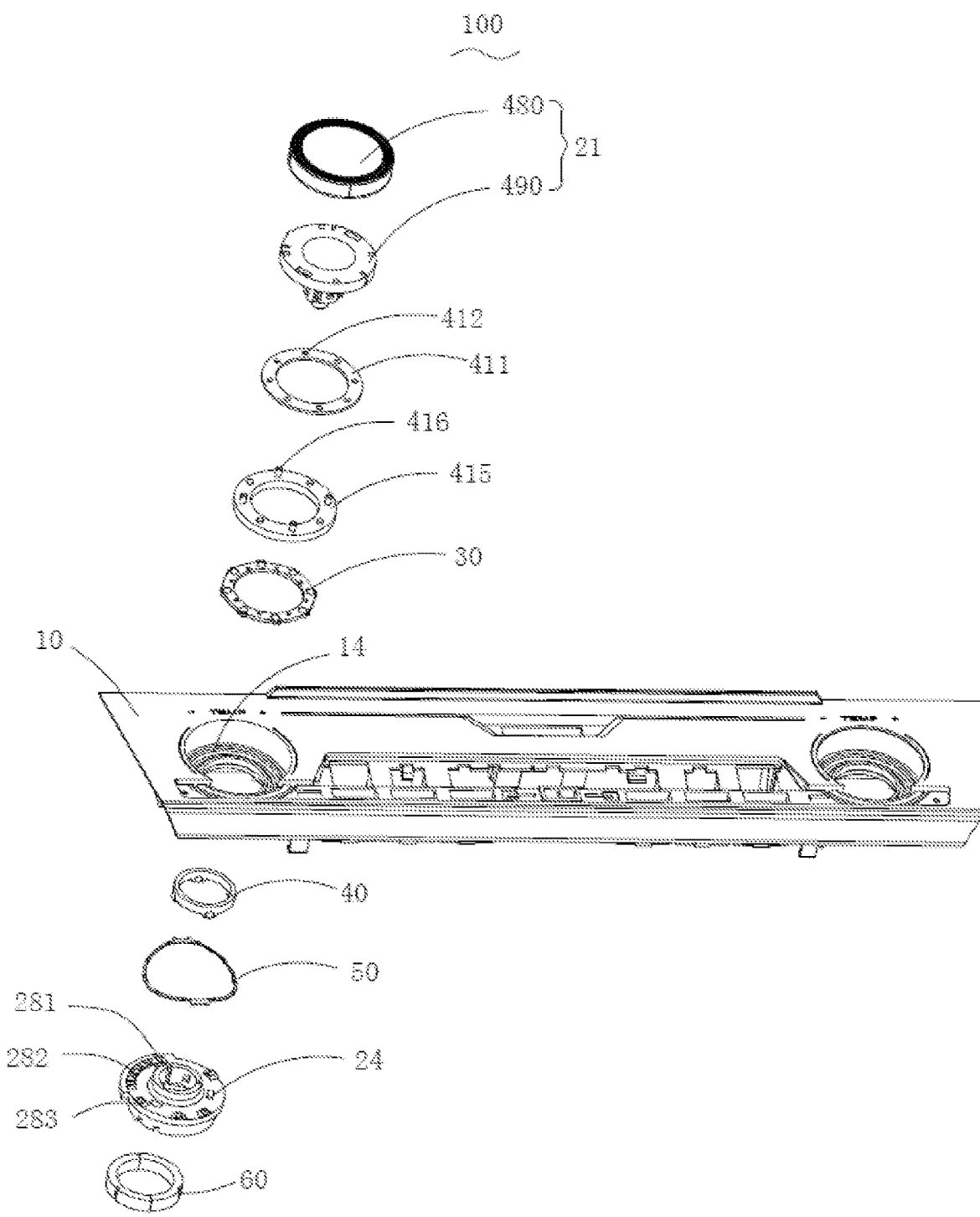
FIG. 31 is a structural schematic exploded perspective view of the controller for vehicle air conditioner shown in FIG. 30, wherein a circuit board with electronic components thereon is omitted.
Figure 32:
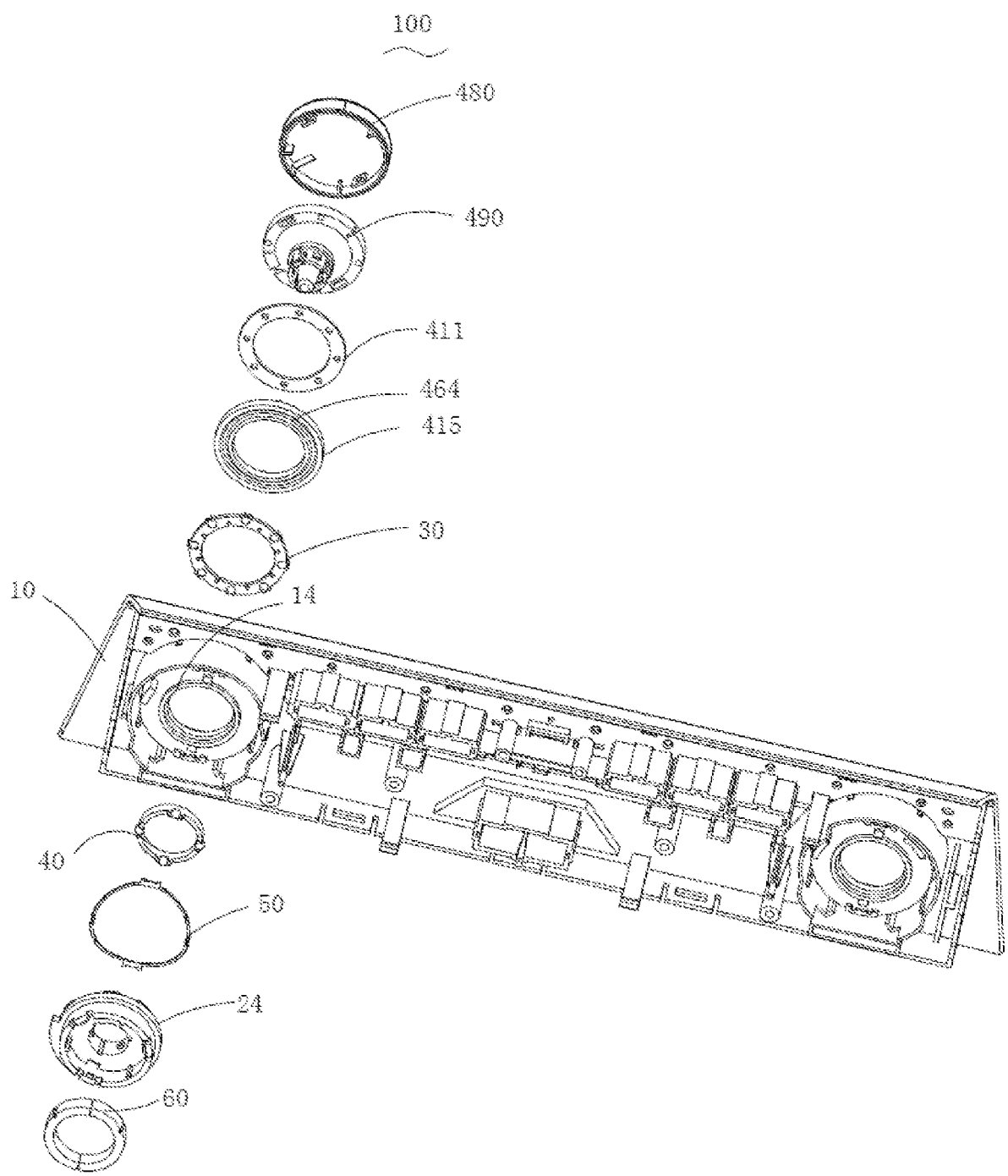
FIG. 32 is a structural schematic exploded perspective view of the controller for vehicle air conditioner shown in FIG. 31, viewed from another aspect.

In the embodiments shown above, the first bearing element 30 and the second bearing element 40 may be rolling bearing elements, but it is to be understood that the bearing elements are not limited to rolling bearing elements. In a controller for vehicle air conditioner 100 according to the embodiment shown in FIG. 29, the first bearing element 30 and the second bearing element 40 are sliding bearing elements. Specifically, the first bearing element 30 is a horizontal sliding bearing element, which is in the shape of an annular plate and is arranged between the upper end surface of the support portion 14 of the base 10 and the lower end surface of the body 22 of the knob cap. The axial end surfaces of the first bearing element 30 serve as friction surfaces for contacting the upper end surface of the support portion 14 of the base 10 and/or the lower end surface of the body 22 of the knob cap. In the context, the horizontal sliding bearing element is defined as a sliding bearing element wherein the axial end surfaces act as the frictional contact areas. If the horizontal sliding bearing element is fixed relative to the knob cap 21, its lower end surface is in sliding contact with the upper end surface of the support portion 14. If the horizontal sliding bearing element is fixed relative to the support portion 14, its upper end surface is in sliding contact with the lower end surface of the body 22 of the knob cap. It is to be understood that two axial end surfaces of the horizontal sliding bearing element may both act as the frictional contact surfaces. In addition, the upper end surface of the support portion 14 of the base 10 and the lower end surface of the body 22 of the knob cap each are provided with an annular groove 92, 93 for receiving the first bearing element 30. It is to be understood that it is possible that only the upper end surface of the support portion 14 of the base 10 or only the lower end surface of the body 22 of the knob cap is provided with an annular groove.

The second bearing element 40 is a vertical sliding bearing element. The second bearing element 40 is also in the shape of an annular plate, which is provided between the radial outer surface of the first section 25 of the shift portion 24 and the radial inner surface of the support portion 14 of the base 10. the radial surfaces of the second bearing element 40 serve as friction areas for contacting the radial outer surface of the first section 25 of the shift portion 24 and/or the radial inner surface of the support portion 14. In the context, the vertical sliding bearing element is defined as a sliding bearing element wherein the radial surfaces act as the frictional contact areas. If the vertical sliding bearing element is fixed relative to the shift portion 24, its radial outer surface is in sliding contact with the radial inner surface of the support portion 14. If the vertical bearing element is fixed relative to the support portion 14, its radial inner surface is in sliding contact with the radial outer surface of the first section 25. It is to be understood that the radial outer surface and the radial inner surfaces of the vertical sliding bearing element may both act as the frictional contact surfaces.

When the knob assembly 20 rotates, the direct friction between the body 22 of the knob cap and the support portion 14 of the base 10 is replaced with the sliding friction between the body 22 and/or the support portion 14 and the first bearing element 30, which reduces the friction and thus the noise. Likewise, the direct friction between the shift portion 24 and the support portion 14 is replaced with the sliding friction between the shift portion 24 and/or the support portion 14 and the second bearing element 40, which can further reduce the friction and thus the noise.

Although this embodiment describes the combination of a first bearing element of the horizontal sliding bearing element and a second bearing element of the vertical sliding bearing element, it can be understood by those skilled in the art that in other embodiments, the first bearing element may be a vertical sliding bearing element, and the second bearing element may be a horizontal sliding bearing element; or both the first and second bearing elements are horizontal sliding bearing elements or vertical bearing elements. In fact, in practice applications, the first bearing element and the second bearing element may be any combination selected from a group of a horizontal rolling bearing elements, a vertical rolling bearing element, a horizontal sliding bearing element, and a vertical sliding bearing element.

FIGS. 30 to 33 show a controller for vehicle air conditioner 100 according to an eleventh embodiment of the present invention. This embodiment is similar to the fifth embodiment shown in FIGS. 11 to 13. For the parts the same as those in the fifth embodiment, reference may be made to related descriptions provided above for the fifth in combination with the first embodiments, and will not be described in details hereinafter again. This embodiment mainly differs from the fifth embodiment in that, the knob cap of the controller for vehicle air conditioner in the fifth embodiment has no backlight display function, whilst the knob assembly 20 of the controller for vehicle air conditioner 100 in this embodiment has a backlight display function. Specifically, the knob assembly 20 in this embodiment includes a knob cap 21 and a shift portion 24 connected to each other. A first bearing element 30, a second bearing element 40, and a spring element 50 are provided between the knob assembly 20 and the support portion 14.

Figure 33:
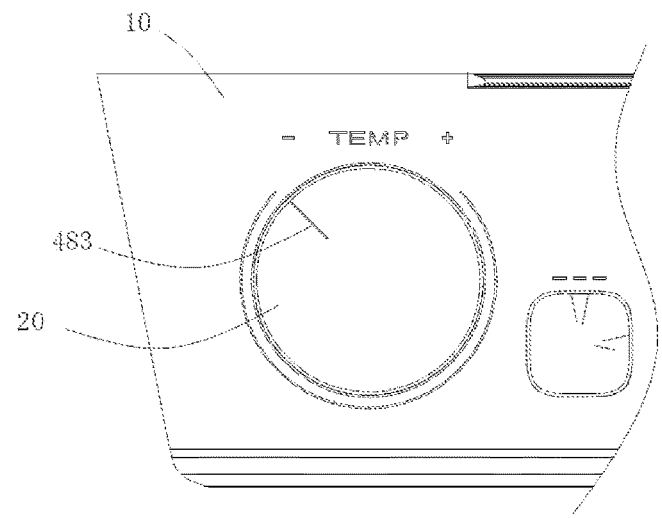
FIG. 33 is a structural schematic front elevation view of the controller for vehicle air conditioner shown in FIG. 30 in a use state.
Figure 34:
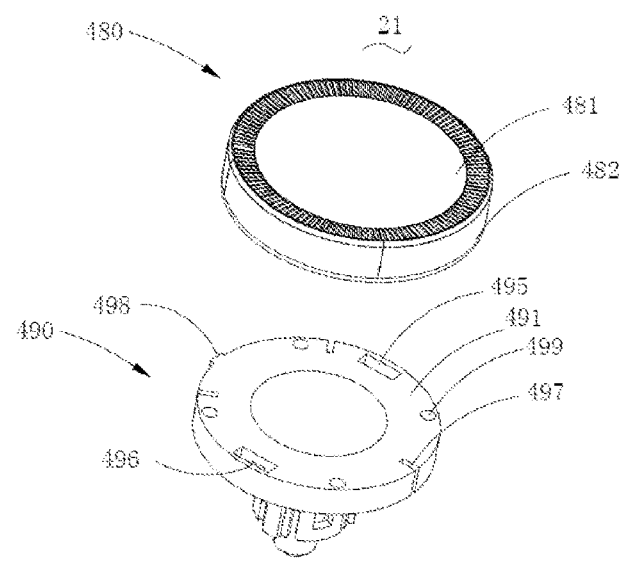
FIG. 34 is a structural schematic exploded perspective view showing a knob cap of the controller for vehicle air conditioner shown in FIG. 31.
Figure 35:
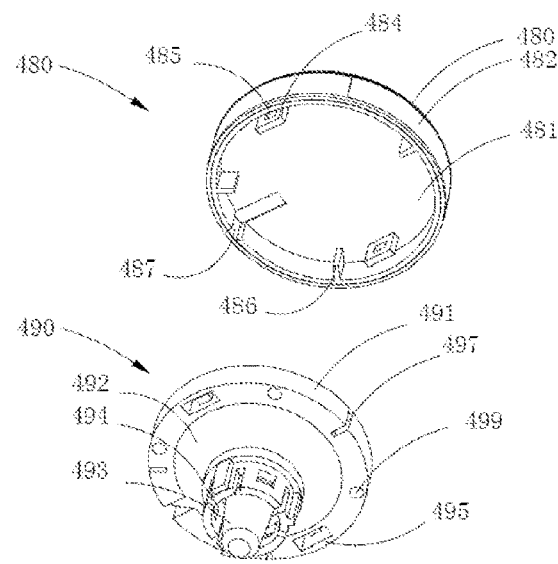
FIG. 35 is a structural schematic exploded perspective view showing the knob cap of the controller for vehicle air conditioner shown in FIG. 32.

The knob cap 21 includes a cap lid 480 and a cap body 490 connected to each other. Referring also to FIGS. 34 and 35, the cap lid 480 includes a top plate 481 and a side plate 482 extending perpendicularly from the periphery of the top plate 481. In this embodiment, the top plate 481 is circular, and the side plate 482 is annular. A light permeable window 483, only shown in FIG. 33, is formed on the cap lid 480. The cap body 490 is made of a material which is transparent or translucent. The cap body 490 includes a fixed rim 491 disposed in and connected to the cap lid 480, a connecting portion 492 extending downwardly from an inner periphery of the fixed rim 491, an extending portion 493 further extending from a lower end of the connecting portion 492, and a connecting post 494 extending from an outer periphery of the connecting portion 492 for connecting with the shift portion 24. The connecting portion 492 of the cap body 490 extends radially inwardly and downwardly from the inner periphery of the fixed rim 491. In this embodiment, the connecting portion 492 is substantially in a hollow conical shape, and the extending portion 493 is substantially cylindrical. The connecting portion 492 extends in a tapered manner from the fixed rim 491 to the extending portion 493. On a cross section of the cap body 490, the connecting portion 492 and the extending portion 493 cooperatively form a Y shape.

Specifically, the cap lid 480 and the fixed rim 491 are connected and positioned by snap-fitting. In this embodiment, the cap lid 480 further includes engaging arms 484, to which the lower end surface of the top plate 481 is adjoined. Each engaging arm 484 is provided with a fastening hole 485. The fixed rim 491 is provided with engaging grooves 495 corresponding to the engaging arms 484 of the cap lid 480, and an inner wall of each engaging groove 495 is provided with a clamping bump 496 for engaging in the fastening hole 485 of the engaging arm 484. The engaging arms 484 of the cap lid 480 are engaged in the engaging grooves 495 of the fixed rim 491 respectively, with the clamping bumps 496 of the engaging groove 495 engaged in the fastening holes 485 of the engaging arms 484, to form a fixed connection therebetween. In addition, the cap lid 480 and the fixed rim 491 of the cap body 490 are further provided with a positioning bump 486 and a positioning groove 497 that fit to each other. Specifically, in this embodiment, the positioning bump 486 is formed on the cap lid 480, which extends downwardly from the top plate 481 of the cap lid 480, and correspondingly the positioning groove 497 is formed in the fixed rim 491 of the cap body 490. The positioning bump 486 is engaged in the positioning groove 497, thereby improving the positioning of the cap lid 480 and the cap body 490, and preventing the cap lid 480 from rotating relative to the cap body 490. To further prevent the cap lid 480 and the cap body 490 from rotating relative to each other, the cap lid 480 and the cap body 490 may further be provided with a limiting groove 487 and a limiting rib 498, respectively. In this embodiment, the limiting groove 487 is recessed from the radial inner wall of the side plate 482 of the cap lid 480, which may extend from the axial bottom end of the side plate 482 to the axial top end of the side plate 482. The limiting rib 498 is formed by protruding outwardly from the outer periphery of the fixed rim 491, and the limiting rib has a shape and a sized respectively matched with a shape and a size of the limiting groove 487.

It is to be understood that in other embodiments, it is possible to modify the position, the shape, and the number of the clamping bump and the fastening hole; the position, the shape, and the number of the positioning bump and the positioning groove; and the position, shape, and the number of the limiting rib and the limiting groove according to practice requirements. In addition, other methods may be used to achieve the stable connection between the cap lid and the cap body, so that the clamping bump and the fastening hole; the positioning bump and the positioning groove; and/or the limiting rib and the limiting groove may be omitted according to practice requirements.

Figure 12:
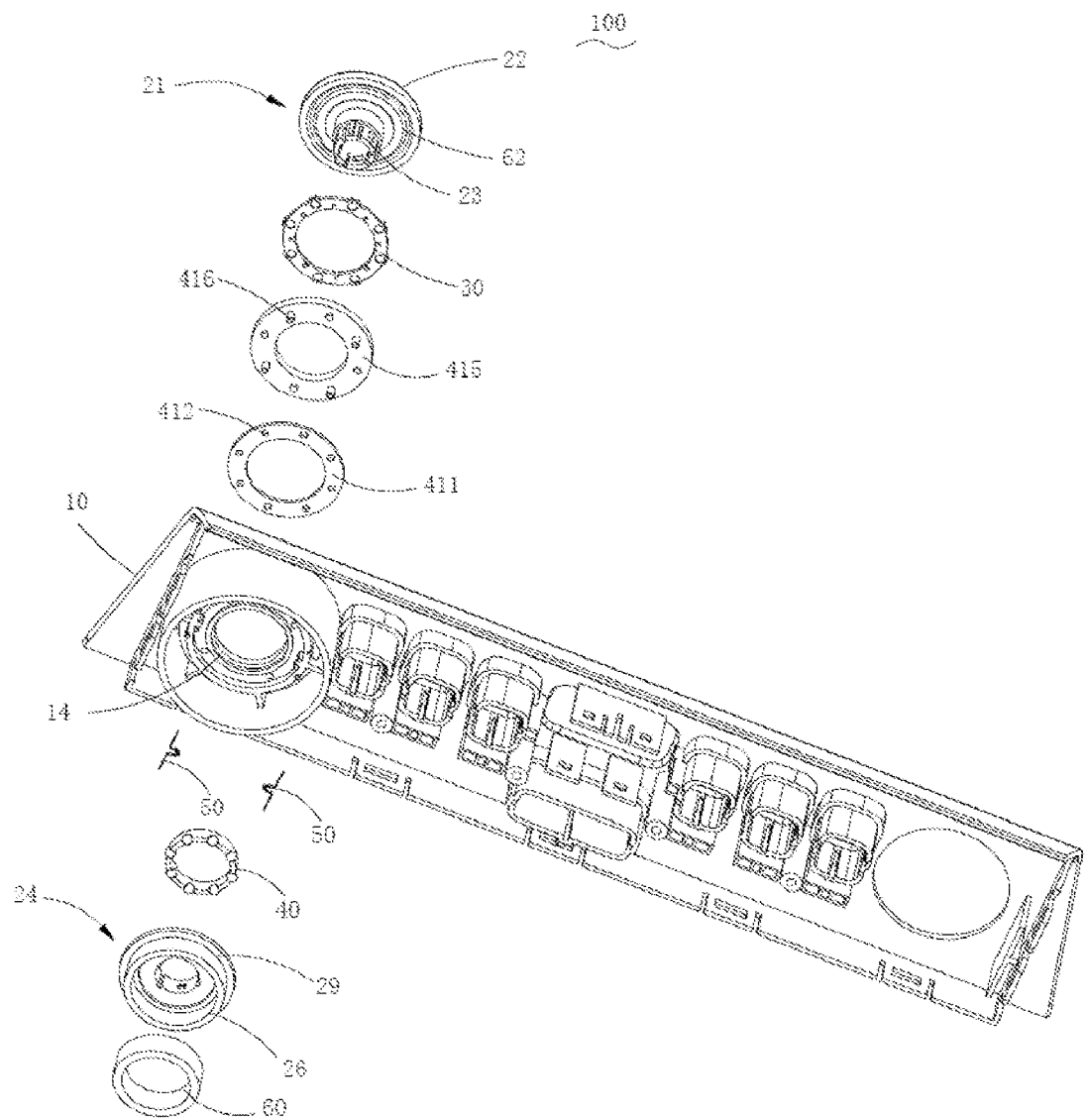
FIG. 12 is a structural schematic exploded perspective view of the controller for vehicle air conditioner shown in FIG. 11, viewed from one aspect.

Similar to the embodiment shown in FIGS. 11 to 13, a buffer 411 and a holder 415 are further provided in this embodiment. The buffer 411 is in the shape of an annular sheet, and may be made of a material with high elasticity, such as rubber. In this embodiment, the material of the buffer 411 may be ethylene propylene diene monomer (EPDM) rubber. In other embodiments, the material of the buffer 411 may be ethylene-vinyl acetate copolymer (EVA). The holder 415 may be made of plastic, and has a hardness and a strength that are greater than those of the buffer 411. In this embodiment, the material of the holder 415 may be polyoxymethylene (POM). The buffer 411 and the holder 415 are provided between the knob cap 21 and the support portion 14. The buffer 411 is supported on the fixed rim 491 of the knob cap 21, and the holder 415 is supported on the buffer 411. The lower surface of the holder 415 faces the upper end surface of the support portion 14, with the first bearing element 30 provided therebetween. In particular, the lower surface of the holder 415 is formed with an annular groove 464 for restricting positions of the first rolling members 35 of the first bearing element 30.

Specifically, the buffer 411 is provided with a plurality of fitting holes 412 along the circumferential direction, and the upper surface of the holder 415 is provided with a plurality of fitting posts 416 corresponding to the fitting holes 412. The buffer 411 and the holder 415 are connected and positioned by fitting the fitting holes 412 and the fitting posts 416. In this embodiment, the length of each fitting post 416 of the holder 415 is greater than the thickness of the buffer 411. The fixed rim 491 of the cap body 490 is also provided with positioning holes 499 corresponding to the fitting posts 416 of the holder 415. The fitting posts 416 of the holder 415 extends through the fitting holes 412 of the buffer 411 and engage into the positioning holes 499 of the fixed rim 491, thereby positioning the holder 415 and the buffer 411 in the circumferential direction.

The spring element 50 of the controller for vehicle air conditioner according to this embodiment is a wave spring having a structure that is the same as that of the wave spring in the embodiment shown in FIGS. 24 to 26, and thus will not be described hereinafter again. Correspondingly, the shift ring 28 of the shift portion 24 includes convex portions 281 that protrude in the axial direction. It is worth mentioning that, unlike the continuous annular shift ring 28 in the embodiment of FIGS. 24 to 26, the shift ring 28 in this embodiment is discontinuous. That is, the convex portions 281 and the concave portions 282 of the shift ring 28 are unevenly distributed. Specifically, one side of the shift ring includes a plurality of convex portions 281 and concave portions 282 that are continuously and alternately arranged, in an arc manner having a corresponding central angle of less than 90 degrees. The shift ring 28 further includes a plurality of second convex portions 283 which are discretely distributed. The continuously distributed convex portions 281 and the discretely distributed second convex portions 283 are located on a same circle.

In this embodiment, a light emitting source 79 is provided on the circuit board 72, which directly faces the end of the extending portion 493 of the cap body 490. In particularly, the light emitting source 79 is an LED lamp. When the controller for vehicle air conditioner 100 of this embodiment works, the light emitted by the light emitting source 79 is transmitted to the fixed rim 491 via the extending portion 493. As the light permeable window 483 on the top plate 481 of the cap lid 480 is provided corresponding to the fixed rim 491, the light can exit from the light permeable window 483 of the cap lid 480 to thereby cause a backlight display.

It should be noted that although the present invention has been illustrated and described in detail by way of examples in the drawings and in the above descriptions, these illustrations and descriptions are merely exemplary and not intended to make any limitation. That is, the embodiments shown and described are provided by way of example only and do not intended to limit the scope of protection of the present invention in any way. It is to be understood that any features described in any embodiment can be used in combination with any other embodiment. Those of ordinary skill in the art should understand that modifications or equivalent substitutions can be made by those skilled in the art to the above embodiments, and all technical solutions and improvements that do not depart from the spirit and scope of the present invention fall within the scope of protection of the present invention.

What is claimed is:

1. A controller for vehicle air conditioner, comprising:
   a base defining a mounting cavity;
   a knob assembly rotatably mounted to the base, wherein at least a portion of the knob assembly is located in the mounting cavity; and
   at least one bearing element arranged between the base and the knob assembly;
   wherein the base comprises a support portion located in the mounting cavity, the knob assembly comprises a knob cap and a shift portion connected to each other, and the at least one bearing element comprises a first bearing element located between the support portion and the knob cap;
   wherein the first bearing element is located between opposed axial end surfaces of the knob cap and the support portion; the first bearing element comprises a retaining ring and a plurality of rolling members, the retaining ring comprises a plurality of receiving holes axially extending therethrough, the rolling members are movably retained within the retaining ring, and two axial ends of each rolling member protrude out from two axial end surfaces of the retaining ring to act as frictional contact areas; and
   wherein the controller for vehicle air conditioner comprises a buffer and a holder arranged between the knob cap and the support portion, wherein one side of the buffer is arranged adjacent to one of the knob cap and the support portion, and the holder is arranged adjacent to an other side of the buffer; the first bearing element is arranged between the holder and an other one of the knob cap and the support portion.

2. The controller for vehicle air conditioner according to claim 1, wherein at least one bearing element comprises a second bearing element located between the support portion and the shift portion.

3. The controller for vehicle air conditioner according to claim 2, wherein the shift portion comprises a first section and a second section which extend in an axial direction, and a shoulder connecting adjacent ends of the first section and the second section to each other; the second bearing element is provided between opposed axial end surfaces of the shoulder of the shift portion and the support portion; the second bearing element comprises a retaining ring and a plurality of rolling members; the retaining rind is provided with a plurality of receiving holes axially extending therethrough, and the rolling members are movably retained within the receiving holes; two axial ends of each rolling member respectively protrude out from two axial end surfaces of the retaining ring and are in fractional contact with the opposed axial end surfaces respectively.

4. The controller for vehicle air conditioner according to claim 2, wherein the shift portion comprises a first section and a second section which extend in an axial direction, and a shoulder connecting adjacent ends of the first section and the second section to each other; the second bearing element is provided between a radial inner surface of the support portion and a radial outer surface of the first section of the shift portion; the second bearing element comprises a retaining sleeve and a plurality of rolling members; the retaining sleeve is provided with a plurality of accommodating holes radially extending therethrough; the rolling members are movably retained in the accommodating holes; two radial sides of each rolling member respectively protrude out from two radial side surfaces of the retaining sleeve and are in frictional contact with the radial inner surface of the support portion and the radial outer surface of the first section respectively.

5. The controller for vehicle air conditioner according to claim 4, wherein at least one of the radial inner surface of the support portion and the radial outer surface of the first section of the shift portion is provided with an inclined surface or a curved surface, and the rolling members of the second bearing element abut against the inclined surface or the curved surface.

6. The controller for vehicle air conditioner according to claim 1, wherein the bearing element of the at least one bearing element is selected from a group consisting of:
   (1) a horizontal rolling bearing element comprising a retaining ring and a plurality of rolling members arranged in the retaining ring, wherein the rolling members protrude out from two ends of the retaining ring in an axial direction to act as frictional contact areas; and
   (2) a vertical rolling bearing element comprising a retaining sleeve and a plurality of rolling members arranged on the retaining sleeve, wherein the rolling members protrude out from two sides of the retaining sleeve in a radial direction to act as frictional contact areas.

7. The controller for vehicle air conditioner according to claim 1, wherein each receiving hole of the first bearing element has a diameter at an axial middle part of the retaining ring greater than a diameter of a respective rolling member, and the diameter of each receiving hole at the axial end surface of the retaining ring is smaller than the diameter of a respective rolling member, and wherein each rolling member is movably retained in a respective receiving hole.

8. The controller for vehicle air conditioner according to claim 7, further comprising:
   a circuit board and a rotation detection component comprising a first element attached to or formed on the knob assembly, and a second element arranged on the circuit board, wherein the rotation detection component is selected from a group consisting of:
   (1) a rotation detection component in which the first element is a detection magnet, and the second element is a Hall element, wherein the detection magnet is attached to the knob assembly, and the Hall element is arranged on the circuit board corresponding to the detection magnet;

(2) a rotation detection component in which the first element is a toothed ring, and the second element is a photoelectric switch, wherein the toothed rind comprises a plurality of notches, and the notches are arranged spaced apart along a circumferential direction of the knob assembly; the photoelectric switch comprises a light emitter and a light receiver which are arranged opposite to each other, and spaced from each other with a gap defined therebetween; when the knob assembly rotates, the toothed ring travels through the gap between the light emitter and the light receiver and alternately blocks and exposes the light emitted by the light emitter; and (3) a rotation detection component in which the first element is a gear, and the second element is a potentiometer, wherein the gear is engaged with the knob assembly, the potentiometer comprises a rotatable shaft to which the gear is connected.

9. The controller for vehicle air conditioner according to claim 1, further comprising:
a spring element arranged between the base and the knob assembly, wherein the shift portion comprises a shift ring, the shift ring forms a plurality of convex portions and a plurality of concave portions which are alternately arranged, the spring element is connected with the base and extends into one of the concave portions of the shift ring, wherein the spring element comprises one selected from a group consisting of: (1) a leaf spring comprising a fixing portion connected with the base and an engaging portion connected to the fixing portion, and the engaging portion extends to the one of the concave portions of the shift ring.

10. The controller for vehicle air conditioner according to claim 7, further comprising a front panel, which is provided with a button installation portion for installing a button, wherein the base is integrally formed with the front panel.

11. The controller for vehicle air conditioner according to claim 1, further comprising a front panel, which is provided with a button installation portion for installing a button, and the front panel comprises a mounting hole, wherein the base, the knob assembly, and the at least one bearing element is capable of being assembled into a pre-assembled component which is detachably mountable into the mounting hole of the front panel.

12. The controller for vehicle air conditioner according to claim 1, further comprising a light-emitting source, wherein the knob cap includes a light permeable window; and light emitted from the light-emitting source exits from the knob cap.

13. The controller for vehicle air conditioner according to claim 1, wherein the support portion is provided with a receiving groove, and the buffer is partially received in the receiving groove.

14. A controller for vehicle air conditioner, comprising:
a base defining a mounting cavity;
a knob assembly rotatably mounted to the base, wherein at least a portion of the knob assembly is located in the mounting cavity; and
at least one bearing element arranged between the base and the knob assembly; wherein the base comprises a support portion located in the mounting cavity, the knob assembly comprises a knob cap and a shift portion connected to each other, and the at least one bearing element comprises a first bearing element located between the support portion and the knob cap;
wherein the first bearing element is located between opposed axial end surfaces of the knob cap and the support portion; the first bearing element comprises a retaining ring and a plurality of rolling members, the retaining ring comprises a plurality of receiving holes axially extending therethrough, the rolling members are movably retained within the retaining ring, and two axial ends of each rolling member protrude out from two axial end surfaces of the retaining ring to act as frictional contact areas; and
wherein the controller for vehicle air conditioner further comprises a buffer and a holder arranged between the knob cap and the support portion, wherein the knob cap comprises a body and a connecting post extending from a central portion of an end surface of the body; the buffer is supported on the support portion, and the holder is supported on the buffer; the first bearing element is arranged between the holder and the body of the knob cap.

15. The controller for vehicle air conditioner according to claim 14, wherein the support portion is provided with a receiving groove, and the buffer is partially received in the receiving groove.

16. The controller for vehicle air conditioner according to claim 14, wherein the at least one bearing element comprises a second bearing element located between the support portion and the shift portion.

17. The controller for vehicle air conditioner according to claim 16, wherein the shift portion comprises a first section and a second section which extend in an axial direction, and a shoulder connecting adjacent ends of the first section and the second section to each other; the second bearing element is provided between a radial inner surface of the support portion and a radial outer surface of the first section of the shift portion; the second bearing element comprises a retaining sleeve and a plurality of rolling members; the retaining sleeve is provided with a plurality of accommodating holes radially extending therethrough; the rolling members are movably retained in the accommodating holes; two radial sides of each rolling member respectively protrude out from two radial side surfaces of the retaining sleeve and are in frictional contact with the radial inner surface of the support portion and the radial outer surface of the first section respectively.

18. The controller for vehicle air conditioner according to claim 17, wherein at least one of the radial inner surface of the support portion and the radial outer surface of the first section of the shift portion is provided with an inclined surface or a curved surface, and the rolling members of the second bearing element abut against the inclined surface or the curved surface.

19. The controller for vehicle air conditioner according to claim 14, wherein the bearing element of the at least one bearing element is selected from a group consisting of:
(1) a horizontal rolling bearing element comprising a retaining ring and a plurality of rolling members arranged in the retaining ring, wherein the rolling members protrude out from two ends of the retaining ring in an axial direction to act as frictional contact areas;
(2) a vertical rolling bearing element comprising a retaining sleeve and a plurality of rolling members arranged on the retaining sleeve, wherein the rolling members protrude out from two sides of the retaining sleeve in a radial direction to act as frictional contact areas.

20. The controller for vehicle air conditioner according to claim 14, wherein each receiving hole of the first bearing element has a diameter at an axial middle part of the retaining ring greater than a diameter of a respective rolling member, and the diameter of each receiving hole at the axial end surface of the retaining ring is smaller than the diameter of a respective rolling member, and wherein each rolling member is movably retained in a respective receiving hole.

\* \* \* \* \*